(12) United States Patent
Keil et al.

(10) Patent No.: US 7,958,006 B2
(45) Date of Patent: Jun. 7, 2011

(54) SYSTEM TO PROVIDE CONSUMER PREFERENCE INFORMATION

(75) Inventors: Sev K. H. Keil, New York, NY (US); Dick R. Wittink, North Haven, CT (US); Hielke Roelof van der Scheer, New York, NY (US)

(73) Assignee: True Choice Solutions, Inc., New York, NY (US)

( * ) Notice: Subject to any disclaimer, the term of this patent is extended or adjusted under 35 U.S.C. 154(b) by 745 days.

(21) Appl. No.: 09/845,051

(22) Filed: Apr. 27, 2001

(65) Prior Publication Data

US 2003/0040952 A1    Feb. 27, 2003

(51) Int. Cl.
*G06Q 30/00* (2006.01)
(52) U.S. Cl. ...................................................... 705/14.1
(58) Field of Classification Search .................. 705/10, 705/14, 26, 14.1
See application file for complete search history.

(56) References Cited

U.S. PATENT DOCUMENTS

| | | | |
|---|---|---|---|
| 5,041,972 A | 8/1991 | Frost | |
| 5,124,911 A | 6/1992 | Sack | |
| 5,583,763 A | 12/1996 | Atcheson et al. | |
| 5,974,396 A | 10/1999 | Anderson et al. | |
| 6,009,407 A | 12/1999 | Garg | |
| 6,012,051 A | 1/2000 | Sammon, Jr. et al. | |
| 6,029,195 A * | 2/2000 | Herz | 725/116 |
| 6,134,532 A | 10/2000 | Lazarus et al. | |
| 6,208,989 B1 | 3/2001 | Dockter et al. | |
| 6,236,975 B1 | 5/2001 | Boe et al. | |
| 6,236,978 B1 | 5/2001 | Tuzhilin | |
| 6,298,348 B1 | 10/2001 | Eldering | |
| 6,321,221 B1 | 11/2001 | Bieganski | |
| 6,826,541 B1 * | 11/2004 | Johnston et al. | 705/36 R |
| 7,062,510 B1 | 6/2006 | Eldering | |
| 2006/0218162 A1 | 9/2006 | Keil et al. | |

FOREIGN PATENT DOCUMENTS

WO    WO-9726612 A1    7/1997

OTHER PUBLICATIONS

Allenby, Greg, Using extremes to design products and segment markets, Journal of Marketing Research, Nov. 1995 (Dialog file 75:00184535).*
"The ACA/HB Module for Hierarchical Bayes Estimation", *Sawtooth Software, Inc.* (Aug. 1999).
Magidson, Jay, and Vermunt, Jeroen K., "Latent Class Models".

(Continued)

*Primary Examiner* — Daniel Lastra
(74) *Attorney, Agent, or Firm* — Fish & Richardson P.C.

(57) ABSTRACT

A system to determine preference information in which preference information associated with a consumer is determined, the preference information is validated, and the preference information is mixed with preference information associated with a plurality of consumers based on the validating step. The validating step may includes provision of trade-off questions to the consumer, reception of actual answers to the trade-off questions, prediction of consumer answers to the trade-off questions based on the preference information associated with the consumer and prediction of subgroup answers to the trade-off questions based on the preference information associated with the plurality of consumers. Moreover, the preference information may be mixed with the preference information associated with the plurality of consumers based on the actual answers, the predicted consumer answers and the predicted subgroup answers.

50 Claims, 15 Drawing Sheets

OTHER PUBLICATIONS

"The CBC Latent Class Technical Paper", *Copyright 2000, Sawtooth Software, Inc.*

Acatech, "Adaptive Conjoint Analysis" (Version 4), *Copyright Sawtooth Software, Inc.* (Apr. 1993).

McCullough, Dick, "Trade-off Analysis": *A Survey of Commercially Available Techniques.*

Srinivasan, V. and Su Park, Chan "Surprising Robustness of the Self-Explicated Approach to Customer Preference Structure Measurement," *Journal of Marketing Research*, vol. XXXIV (May 1997), 286-291.

Wittink, Dick R. and Keil, Sev K. "Continuous Conjoint Analysis".

Huber, Joel, "What We Have Learned from 20 Years of Conjoint Research": *When to use Self-Explicated, Graded Pairs, Full Profiles or Choice Experiments.*

2001 Conference Presentations Set (Spring 2001), *Sawtooth Solutions.*

Orme, Bryan "Helping Managers Understand the Value of Conjoint", *Copyright, Sawtooth Software*, 1996.

Pinnell, Jon and Olsen, Pam "Using Choice-Based Conjoint To Assess Brand Strength and Price Sensitivity", *Copyright 1996, Sawtooth Software.*

Pinnell, Jon (1994) "Multistage Conjoint Methods to Measure Price Sensitivity".

Dawson, Neal V. (91-94) "A Model of Patients' Preferences in Serious Illness", http://www.ahcpr.gov/clinic/medteprp/list8.htm, (Download date Mar. 30, 2001).

Marketswitch: "Our Industry", http://www.marketswitch.com/products/industry.html, (Download date Mar. 26, 2001).

Kanninen, Barbara, K. (Jan. 1, 2000-Jun. 30, 2002) "Optimal Experimental Design for Nonmarket Choice Experiments", http://www.es.epa.gov/ncerga_abstracts/grants/99/deci/kanninen.html, (Download dated Apr. 11, 2001).

Rollins, Kimberly and Beckett, Alexandra, "Using a Random Utility Model to Measure Willingness to Pay for Public Attributes of Green Goods: Implications for Market Provision of Environmental Quality", *International Institute of Fisheries Economics and Trade, Microbehavior and Macroresults IIFET 2000*, http://www.orst.edu/Dept/IIFET/2000/abstracts/rollins.html (Download date Apr. 11, 2001).

Ardila, Sergio, Quiroga, Ricardo and Vaughan, William J. (Dec. 1998, ENV-126, E) Publications "A Review of the Use of Contingent Valuation Methods in Project Analysis at the Inter-American Development Bank", http://www.iadb.org/sds/publication/publication_178_e.htm (Download date Apr. 11, 2001).

Understanding Market Segmentation, *Technical Paper From DDS Research*, http://www.dssearch.com/marketsegment/Library/Segment/understanding.asp.

Tyner, Mary Jane and Weiner, Jonathan—MACRO—"Optimal Pricing Strategies Through Conjoint Analysis", http://www.macroinc.com/html/art/s_opt.html (Download date Apr. 10, 2001).

"Customer Targeting Models", *Opti-Market Consulting*, http://www.opti-market.com/targeting.htm (Download date Apr. 10, 2001).

Johnson, Chad, Methodologies and Capabilities: "Market simulation software becomes smarter all the time", *Answers Research, Inc.* http://www.answersresearch.com/methodologies/article5.html (Download date Apr. 10, 2001).

Market Research Application Example, "Conjoint Analysis: *The Pressure*", Statistics & Operations Research, http://www.sas.com/rnd/app/da/market/mraexsim.html (Download date Apr. 10, 2001).

"Research Triangle Institute: Conjoint Analysis Software Tools", http://www.rti.org/difference/conjoint_tools.cfm (Download date Apr. 10, 2001).

Decision Support Inc., A Full Service Market Research & Consulting Firm, "Services Offered" http://www.decisionsupportinc.com/services.html (Download date Apr. 10, 2001).

Landsend.com, "My Personal Shopper: Like having a personal wardrobe" http://www.landsend.com/vpsEntry.cgi?mode=GRAPHIC&refer=c.../&sid=098702323344 (Download date Apr. 11, 2001).

Direct1.com "About Direct1" http://www.direct1.com/company/whatdowedo.html (Download date Apr. 3, 2001).

Discretechoice.com "White Papers: Sample Discrete Choice Analysis", http://www.discretechoice.com/analysis.html (Download date Jan. 2, 2001).

Minetheme Knowledge Bank "Information: that Inspires", http://www.mindtheme.com/knowledge/trst.asp (Download date Apr. 10, 2001).

Dominator 2000™ Market Simulation Model From DSS Research, Dominator 2000™ http://www.dssresearch.com/library/Dominator/dominator.asp (Download date Apr. 10, 2001).

Conjoint Analysis Tools, http://www.whitehorse.com.au/~prosoft/statist.htm (Download date Feb. 14, 2001).

Johnson, Richard. M., Sawtooth Technologies: "Trade-Off Analysis of Consumer Values" reprinted from *Journal of Marketing Research*, published by the American Marketing Association, vol. 11 (May 1974), pp. 121-127, http://www.sawtooth.com/news/library/articles/johnson.htm (Download date Feb. 14, 2001).

McCullough, Dick "The Cake Method: A Proprietary Hybrid Conjoint Approach", Macro Consulting, Inc., http://www.macroinc.com/html/art/s_cak.html (Download date Dec. 6, 2000).

ACA, "Adaptive Conjoint Analysis", http://www.sawtoothsoftware.com/ACA.htm (Download date Nov. 30, 2000).

"Analysis: Conjoint Case Example From DSS Research—Marketing Research for . . . ", http://www.dssresearch.com/conjoint/CaseExample/Analysis.asp (Download date Apr. 2, 2001).

A Review of Conjoint Analysis, Technical Paper from DSS Research: "Understanding Conjoint Analysis", http://www.dssresearch.com/conjoint/Library/Conjoint/conjoint.asp (Download date Apr. 2, 2001).

Novak, Tom "Online Exercises: Design Your Own Movie Theater Using Conjoint Analysis", Interactive Exercises, http://www2000.ogsm.vanderbilt.edu/novak/conjoint-Movies/ (Download date Apr. 11, 2001).

Mangen Research Associates, Inc., (1999) "Introduction to Conjoint Analysis", http://www.mrainc.com/conj_intro.html (Download date Feb. 14, 2001).

Sawtooth Software, "Conjoint Analysis: ACA Description", http://www.sawtoothsoftware.com/aca.shtml (Download date Feb. 14, 2001).

Mangen Research Associates, Inc. (1999) "Correlation of Estimates—Conjoint Analysis", http://www.mrainc.com/estimate_conj.html (Download date Jan. 2, 2001).

Online Insight—Thanks for your time, file://D:\StartHere.html (Download date Dec. 18, 2000).

"Active Buyers Guide", *Active Decisions, Inc.*, (2002).

"Active Sales Assistant", *Active Decisions, Inc.*, (2001).

"eBranding Study: Oneline Insight & jAccenture—"What is Conjoint?"", [http://www.onlineinsight.com/ebranding/conjoint.html], (Apr. 27, 2001).

Bajaj, Akilesh , "A Study of Senior Information Systems Mangers' Decision Models in Adopting New Computing Architectures", *Journal of the Association for Information Systems*, (Jun. 2000).

Bajaj, Akilesh , "Factors Relevant to Senior Information Systems Managers' Decision to Adopt New Computing Paradigms: An Exploratory Study", [http://lost-contact.mit.edu/afs/net/project/afs32/andrew.cmu.edu/supa/wpapers/1998], (1998).

Kislinger, Gunter , "Die Anwendung des Teilnutzenwertmodells in der Martsegmentierung", *Karl-Franzens-Universitaet Graz* (Austria), (1990).

Lau, Kin-Nam , "Evaluating Consumer Preferences for Existing Multiattribute Products: A Non-Metric Approach", *College of Business Administration, North Dakota State University*, (1993).

Paul, Lauren , "1 to 1 Marketer", [www.1to1.com/Building/CustomerRelationships/entry.jsp?REQUESTED_URL], (May 31, 2001).

Green, et al., "Conjoint Analysis in Consumer Research: Issues and Outlook", *The Journal of Consumer Research*, 5(2), http://www.jstor.org/, (Sep. 1978), 103-123.

Griffin, A., et al., "The Voice of the Customer", *Marketing Science*, 12(1), http://www.jstor.org/,(1993),1-27.

\* cited by examiner

| ATTRIBUTE 112 | ATTRIBUTE LEVEL/ASSOCIATED PART WORTH VALUE 114 |
|---|---|
| COLOR | YELLOW/6; BLUE/2; GREEN/0 |
| PRICE | $450/9; $550/3; $650/0; $750/X |
| BRAND | ROSSIGNOL/10; VOLKL/0; FISCHER/2; K2/5 |
| TYPE | ALL MOUNTAIN/0; JUNIOR/X; SLALOM/5; GS/8 |

CONSUMER: JOHN DOE; PRODUCT: DOWNHILL SKI; RAW — 100, 110

FIG. 2

| CONSUMER: JOHN PUBLIC; PRODUCT: DOWNHILL SKI; RAW 110 | 114 |
|---|---|
| ATTRIBUTE 112 | ATTRIBUTE LEVEL/ASSOCIATED PART WORTH VALUE |
| COLOR | YELLOW/0; BLUE/6.8; GREEN/2.72 |
| PRICE | $450/4; $550/2; $650/0; $750/X |
| BRAND | ROSSIGNOL/10; VOLKL/3; FISCHER/0; K2/5 |
| TYPE | ALL MOUNTAIN/1.82; JUNIOR/1.04; SLALOM/0; GS/2.6 |

| COLOR/PRICE | $450 | $550 | $650 | $750 |
|---|---|---|---|---|
| BLUE | 10.8 | 8.8 | 6.8 | N/A |
| GREEN | 6.72 | 4.72 | 2.72 | N/A |
| YELLOW | 4 | 2 | 0 | N/A |

| TRADE-OFF QUESTION | OBJECT 1 | | v. | OBJECT 2 | | ACTUAL PREFERENCE INTENSITY | PREDICTED PREFERENCE INTENSITY | PREDICTED SUBGROUP PREFERENCE INTENSITY |
|---|---|---|---|---|---|---|---|---|
| 1 | $550 | ALL MOUNTAIN | | $450 | JUNIOR | -150 | -61 | -176 |
| 2 | GREEN | ROSSIGNOL | | BLUE | VOLKL | 100 | 146 | 96.5 |
| 3 | $450 | ALL MOUNTAIN | | $550 | GS | 50 | 61 | 45.5 |
| 4 | $550 | GS | | $450 | JUNIOR | -50 | -22 | 5.5 |
| 5 | YELLOW | ROSSIGNOL | | BLUE | VOLKL | 50 | 10 | 61 |
| 6 | BLUE | K2 | | GREEN | ROSSIGNOL | -100 | -46 | -155.5 |
| 7 | YELLOW | ROSSIGNOL | | BLUE | K2 | -50 | -90 | -61 |
| 8 | $550 | ALL MOUNTAIN | | $450 | JUNIOR | 200 | 139 | -121.5 |

CONSUMER: JOHN PUBLIC; PRODUCT: DOWNHILL SKI; CURRENCY-NORMALIZED 100 110

| ATTRIBUTE 112 | ATTRIBUTE LEVEL/ASSOCIATED PART WORTH VALUE 114 |
|---|---|
| COLOR | YELLOW/0; BLUE/340; GREEN/136 |
| PRICE | $450/200; $550/100; $650/0; $750/X |
| BRAND | ROSSIGNOL/500; VOLKL/150; FISCHER/0; K2/250 |
| TYPE | ALL MOUNTAIN/91; JUNIOR/52; SLALOM/0; GS/130 |

FIG. 11

| SUBGROUP: AII; PRODUCT: DOWNHILL SKI; CURRENCY-NORMALIZED 110 | |
|---|---|
| ATTRIBUTE 112 | ATTRIBUTE LEVEL/ASSOCIATED PART WORTH VALUE 114 |
| COLOR | YELLOW/97.43; BLUE/65.03; GREEN/0.4 |
| PRICE | $450/220; $550/87.5; $650/43.3; $750/0 |
| BRAND | ROSSIGNOL/130.43; VOLKL/34.43; FISCHER/54.43; K2/99.00 |
| TYPE | ALL MOUNTAIN/50.5; JUNIOR/33.2; SLALOM/51.33; GS/109.10 |

FIG. 12

CONSUMER: JOHN PUBLIC; PRODUCT: DOWNHILL SKI; STABILIZED 100

| ATTRIBUTE 112 | ATTRIBUTE LEVEL/ASSOCIATED PART WORTH VALUE 110 114 |
|---|---|
| COLOR | YELLOW/111.11; BLUE/55.67; GREEN/.2 |
| PRICE | $450/213; $550/76.7; $650/2.2; $750/X |
| BRAND | ROSSIGNOL/180.95; VOLKL/16.61; FISCHER/49.94; K2/105.76 |
| TYPE | ALL MOUNTAIN/30.1; JUNIOR/X; SLALOM/80.66; GS/145.45 |

FIG. 14

| CONSUMER: JOHN PUBLIC | DOWNHILL SKI | | DATA COLLECTED: 12/12/01, 5:23PM |
|---|---|---|---|
| ATTRIBUTE | ATTRIBUTE LEVEL/ASSOCIATED CURRENCY-NORMALIZED PART WORTH VALUE | | |
| COLOR | YELLOW $UTILITY = 111.11 | BLUE $UTILITY = 55.67 | GREEN $UTILITY = .2 |
| PRICE | $450 $UTILITY = 213 | $550 $UTILITY = 76.7 | $650 $UTILITY = 2.2 | $750 $UTILITY = X |
| BRAND | ROSSIGNOL $UTILITY = 180.95 | VOLKL $UTILITY = 16.61 | FISCHER $UTILITY = 49.94 | K2 $UTILITY = 105.76 |
| TYPE | ALL MOUNTAIN $UTILITY = 30.1 | JUNIOR $UTILITY = X | SLALOM $UTILITY = 80.66 | GS $UTILITY = 145.45 |

"X" REPRESENTS PART WORTH VALUES THAT ARE UNKNOWN BECAUSE ASSOCIATED ATTRIBUTE LEVELS ARE UNACCEPTABLE TO CONSUMER.

FIG. 15

SYSTEM TO PROVIDE CONSUMER PREFERENCE INFORMATION

CROSS-REFERENCE TO RELATED APPLICATIONS

This application is related to the following co-pending and commonly assigned U.S. Patent Applications:

U.S. patent application Ser. No. 09/754,612, filed Jan. 4, 2001, for "SYSTEM TO QUANTIFY CONSUMER PREFERENCES";

U.S. patent application Ser. No. 10/008,995, filed Nov. 5, 2001, for "PREFERENCE INFORMATION—BASED METRICS"; and U.S. patent application Ser. No. 10/635,387, filed Aug. 6, 2003, for "SYSTEM TO QUANTIFY CONSUMER PREFERENCES".

BACKGROUND OF THE INVENTION

1. Field of the Invention

The present invention relates to systems for determining consumer preferences. More specifically, the invention relates to systems for determining consumer preference information relating to product attributes and to product attribute levels.

2. Description of the Related Art

During the design of a product, a manufacturer must choose from among several available product features, or attributes, to include in the product. Some attributes may be optional while others may be required. In the case of a television set, "Chassis color" is an attribute that must be included and "Picture-in-picture" is an optional attribute. For each included attribute, a manufacturer must also choose an attribute level to associate with the attribute. Attribute levels that may be associated with the attribute "Chassis color" include "black", "white", "blue", etc.

Trade-off analysis techniques attempt to determine consumers' preferences for particular product attributes and attribute levels in order to identify ideal product configurations. A consumer, in this regard, is any entity to which a product may be offered. Such consumers include individuals, businesses, and purchasing managers, and a product may include a good and/or service.

For example, trade-off analysis techniques allow a manufacturer to compare the attractiveness of a Sony television priced at $599 with that of a Magnavox television priced at $399. Such a comparison is possible because the techniques associate a particular numerical value with a consumer's preference for each attribute and attribute level. Accordingly, the relative attractiveness of differences or changes in attributes with respect to differences or changes in any other attribute can be determined simply by comparing the appropriate associated numerical values. For example, the attractiveness of a price change from $599 to $399 may be compared with the attractiveness of a brand change from Magnavox to Sony. Therefore, by using consumer preference information, a manufacturer is more likely to choose product configurations as well as production amounts and prices for each product configuration that improve sales objectives such as overall profit, consumer satisfaction and consumer loyalty.

As described in the Background of commonly-assigned co-pending U.S. patent application Ser. No. 09/754,612, entitled SYSTEM TO QUANTIFY CONSUMER PREFERENCES, which is incorporated by reference herein for all purposes, conventional trade-off analysis techniques include conjoint, discrete choice, self-explicated, and hybrid techniques. Each of these techniques may be used to produce consumer preference information. However, these techniques often fail to produce a full complement of consumer preference information associated with a particular consumer. In other instances, the produced consumer preference information unsatisfactorily reflects the particular consumer's preferences. As a result, it is difficult to use conventionally-collected consumer preference information to accurately determine, for example, an amount of change in a consumer's preference for a product that would result from a change in a particular attribute or a particular attribute level of the product.

In an attempt to address the foregoing, some conventional systems apply stabilization algorithms to the produced consumer preference information. The stabilization algorithms are intended to improve the predictive precision and completeness of the consumer preference information. In one conventional system, the Adaptive Conjoint Analysis/Hierarchical Bayes module sold by Sawtooth Software, Inc., consumer preference information of other consumers is used to stabilize consumer preference information of a subject consumer. However, these conventional stabilization algorithms are also not seen to produce sufficiently predictive or complete consumer preference information.

In view of the foregoing, what is needed is a system to determine consumer preference information that provides greater predictive precision than that produced by conventional systems.

SUMMARY OF THE INVENTION

In order to address the foregoing need, the present invention provides a system to determine consumer preference information in which preference information associated with a consumer is determined, and the preference information is mixed with preference information associated with a plurality of consumers. According to this aspect, a degree to which the preference information associated with the consumer is mixed with the preference information associated with the plurality of consumers is different than a second degree to which second preference information associated with a second consumer is mixed with preference information of a second plurality of consumers.

By virtue of the above features, the present invention may mix consumer preference information associated with a consumer with preference information associated with a group of consumers according to different degrees depending upon one or more factors. As a result, the present invention provides consumer preference information which is more predictive and complete than that produced by previous systems. For example, in order to produce consumer preference information for a first consumer, consumer preference information associated with the first consumer may be mixed with consumer preference information associated with a first group of consumers in a 25/75 ratio. On the other hand, in order to produce consumer preference information for a second consumer, consumer preference information associated with the second consumer may be mixed with consumer preference information associated with a second group of consumers in a 60/40 ratio. It should be noted that the first and second group of consumers may include all, some or no identical consumers. It should also be noted that the mix may be represented by measures of degree other than the simple ratios of the previous example.

Further to the foregoing aspect, trade-off questions are provided to the consumer, actual answers to the trade-off questions are received, consumer answers to the trade-off questions are predicted based on the preference information associated with the consumer, and subgroup answers to the trade-off questions are predicted based on the preference information associated with the plurality of consumers. Moreover, the preference information associated with the consumer is mixed with the preference information associated with the plurality of consumers based on the actual answers, the predicted consumer answers and the predicted subgroup answers. The steps of this further aspect allow additional control and accuracy in determining the degree to which consumer preference information associated with the consumer should be mixed with consumer preference information associated with the plurality of consumers.

According to another aspect, the present invention relates to a system to determine preference information in which preference information associated with a consumer is determined, the preference information is validated, and the preference information is mixed with preference information associated with a plurality of consumers based on the validating step. This aspect advantageously provides mixing that may differ among consumers. That is, because mixing according to this aspect is based on the validating step, mixing may differ in cases where the validating step differs. As such, more appropriate mixing may be achieved than that achieved by previous systems.

In a related aspect, the validating step includes provision of trade-off questions to the consumer, reception of the consumer's actual answers to the trade-off questions, prediction of the consumer's answers to the trade-off questions based on the preference information associated with the consumer and prediction of subgroup answers to the trade-off questions based on the preference information associated with the plurality of consumers. Moreover, the preference information is mixed with the preference information associated with the plurality of consumers based on the actual answers, the predicted consumer answers and the predicted subgroup answers. This aspect provides even more appropriate mixing that produces predictive and useful consumer preference information associated with a particular consumer.

According to yet another aspect, the present invention concerns a system to determine trade-off questions based on a plurality of attribute levels, each of the plurality of attribute levels being associated with an attribute and a part worth utility value. In the system, attribute levels are grouped into objects including two attribute levels, each of the two attribute levels of an object being associated with different attributes, and the objects are grouped into pairs, each of which include two objects, a first object of a pair including a first two attribute levels associated with two attributes and a second object of the pair including a second two attribute levels associated with the two attributes. A plurality of pairs on which to base the plurality of trade-off questions are selected from the pairs, wherein a first pair is more likely to be selected than a second pair if a sum of part worth utility values associated with each of the attribute levels of the first pair is greater than a sum of part worth utility values associated with each of the attribute levels of the second pair. By virtue of this aspect, questions may be determined that deal with trade-offs in which a responding consumer is most interested, and allowing for thorough testing of the predictive precision of collected preference information.

With these and other advantages and features that will become hereafter apparent, a more complete understanding of the nature of the invention can be obtained by referring to the following detailed description and to the drawings appended hereto.

BRIEF DESCRIPTION OF THE DRAWINGS

FIG. 2 is a representative view of a tabular portion of a preference information database according to embodiments of the present invention.

FIG. 6 is a representative view of a tabular portion of a preference information database according to embodiments of the present invention.

FIG. 7 is a representative view of a matrix used to determine trade-off questions according to one embodiment of the invention.

FIG. 8 is a representative view of a tabular portion of a validation answer database according to embodiments of the present invention.

FIG. 11 is a representative view of a tabular portion of a preference information database according to embodiments of the present invention.

FIG. 12 is a representative view of a tabular portion of a preference information database according to embodiments of the present invention.

FIG. 14 is a representative view of a tabular portion of a preference information database according to embodiments of the present invention.

FIG. 15 is a view of consumer preference information as presented to a client according to embodiments of the present invention.

DETAILED DESCRIPTION

Figure 1:
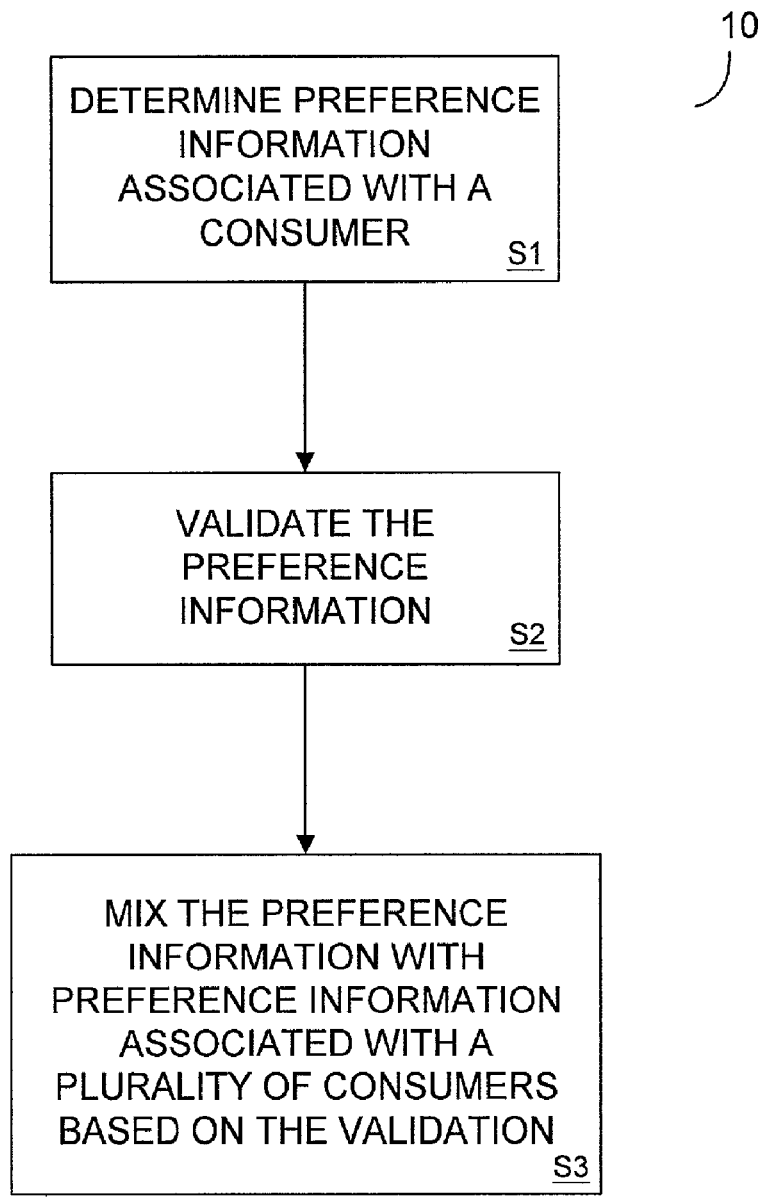
FIG. 1 is a flow diagram of process steps to provide consumer preference information according to embodiments of the present invention.

FIG. 1 is a flow diagram of process steps 10 according to embodiments of the invention. Process steps 10 will be described briefly below in the interest of providing an immediate introduction to features of the present invention. Accordingly, process steps 10 will be described later with respect to more specific examples and specific hardware and software embodiments, along with details of alternative embodiments.

Process steps 10 begin at step S1, in which preference information associated with a consumer is determined. The preference information may be determined by retrieving stored preference information or by using a system such as that described in aforementioned U.S. patent application Ser. No. 09/754,612 to collect consumer preference information. Of course, other systems to collect preference information may be used in step S1 in order to determine preference information, with varying degrees of output quality resulting therefrom.

The preference information determined in step S1 may include information such as that shown in FIG. 2. In this regard, FIG. 2 is a view of a tabular representation of a portion of preference information database 100 according to embodiments of the invention. As shown, the tabular portion includes several fields and several records associated with one or more of the fields. Identification field 110 indicates the consumer and the product associated with the tabular portion and also indicates a type of preference information stored in the tabular portion. In the present example, identification field 110 indicates that the tabular portion stores "Raw" preference information. Different types of preference information that may be stored in preference information database 100 will be discussed in detail below.

The records in the tabular portion of FIG. 2 include attribute field 112 and attribute level/associated part worth value field 114. Attribute field 112 specifies an attribute of the product specified in identification field 110, and attribute level/associated part worth value field 114 specifies attribute levels corresponding to an associated attribute as well as part worth values associated with each specified attribute level. A part worth value, as described in detail in application Ser. No. 09/754,612, is a value that represents a consumer's preference, or utility, for an associated attribute level. A part worth value may therefore be used in order to compare a consumer's preference for one attribute level of an attribute over a second attribute level of the attribute with the consumer's preference for a first attribute level of a second attribute over a second attribute level of the second attribute. More particularly, to the consumer reflected in FIG. 2, the attractiveness of the color yellow over the color green (6−0=6) is greater than the attractiveness of the brand K2 over the brand Fischer (5−2=3).

Some part worth values associated with attribute levels in preference information database 100 comprise the symbol "X". This symbol indicates that the associated attribute level is unacceptable to the associated consumer. Stated differently, any product including the associated attribute level would be unacceptable to the consumer. In the present example, the associated consumer would be unwilling to purchase any Junior type downhill ski.

The attributes and attribute levels associated with a product in preference information database 100 may be determined based on information obtained from a manufacturer of the product. Generally, the attributes and attribute levels are features for which the manufacturer wishes to obtain consumer preference information. It should be understood that, although the present disclosure primarily discusses manufacturers, the present invention may be utilized by sellers, distributors, market researchers or other parties interested in obtaining consumer preference information.

It should be noted that the information stored in preference information database 100 for a particular product may reflect fewer or more attributes and/or attribute levels than shown in FIG. 2. Furthermore, it is contemplated that preference information database 100 may store data corresponding to multiple consumers and to multiple products for each consumer. On the other hand, it is contemplated that preference information database 100 may store preference information associated with multiple consumers but corresponding only to those products to be sold by a particular manufacturer.

Preference information stored in preference information database 100 might not include a part worth value associated with each attribute level. Also, the preference information might not include unacceptable attribute levels. In other words, the particular representation of preference information that is shown in FIG. 2 does not reflect all possible types and representations of preference information.

After the preference information is determined in step S1, the preference information is validated in step S2. Validation is generally a test to determine the predictive precision of the preference information with respect to the associated consumer. In one embodiment, validation of preference information includes presenting questions to the consumer, receiving actual answers to the questions, and predicting answers based on the preference information. In another embodiment, validation of preference information further includes determining an extent to which the consumer's actual answers to the questions match the consumer's predicted answers.

Next, in step S3, the preference information is mixed with preference information associated with a plurality of consumers based on the validation. In this regard, preference information database 100 may store average preference information representing a subgroup of past consumers. In one embodiment, the average preference information is mixed with the preference information determined in step S1 based on the actual answers to the questions presented during validation, the answers predicted based on the determined preference information, and answers predicted based on the average preference information.

In some embodiments of step S3, the preference information associated with the consumer is mixed with the preference information associated with the plurality of consumers to a degree that differs from consumer to consumer. In a specific example, preference information associated with a first consumer may be mixed with preference information associated with a plurality of consumers in a 60/40 ratio while preference information associated with a second consumer may be mixed with preference information associated with the same or a different plurality of consumers in a 20/80 ratio.

The mixed preference information resulting from step S3 may more accurately reflect preferences of the consumer than either the preference information determined in step S1 or the preference information associated with the plurality of consumers. Consequently, process steps 10 may be used to produce consumer preference information which is more predictive and complete than that produced by previous systems.

Network Architecture

Figure 3:
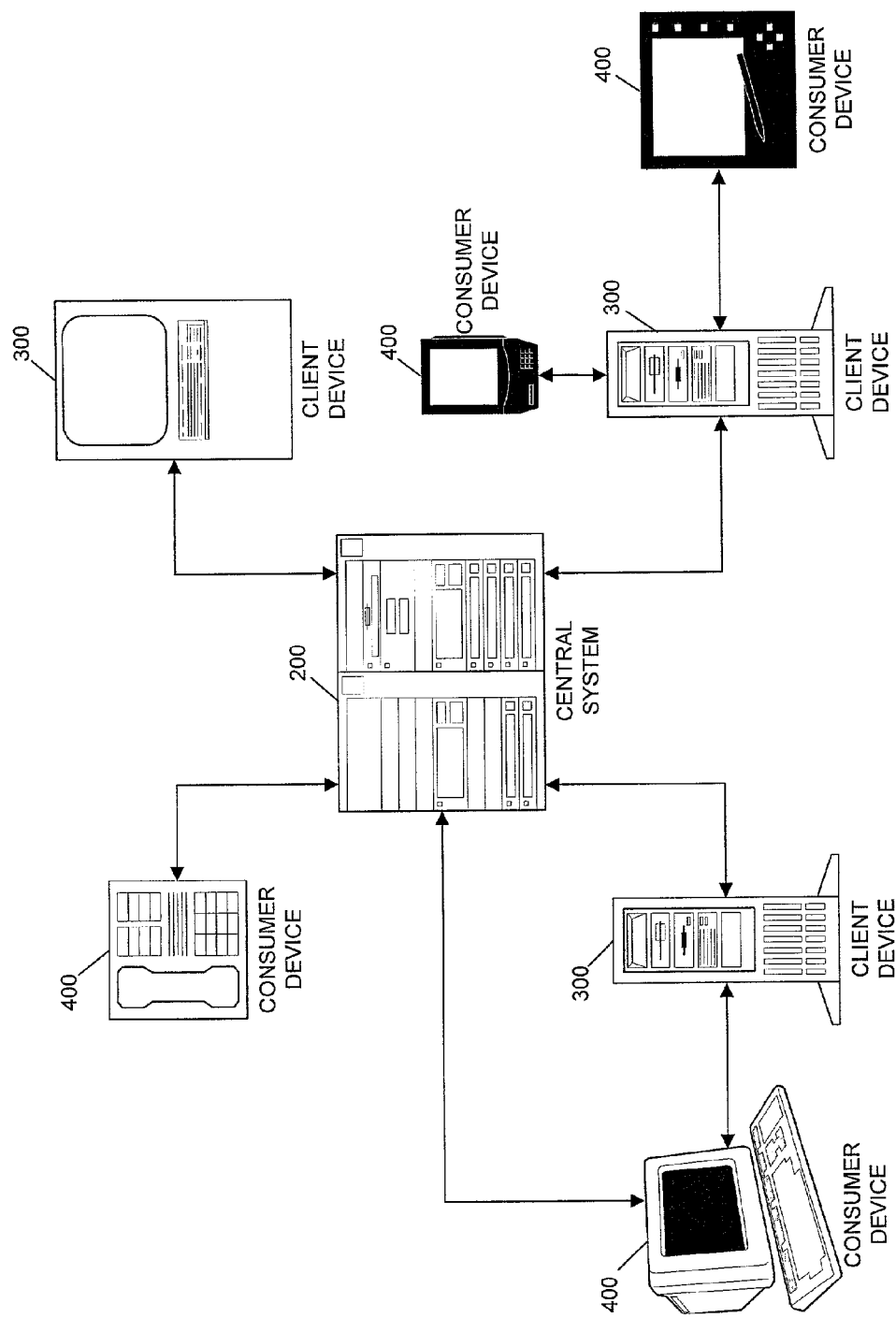
FIG. 3 is a topographic view of a network architecture according to embodiments of the present invention.

FIG. 3 is a topographic view of a network architecture according to embodiments of the present invention. Of course, many other architectures may be used to implement the invention. Shown in FIG. 3 is central system 200, depicted as a mainframe computer. Central system 200 may be used to perform, for example, process steps 10 in order to determine preference information consisting of part worth values associated with a consumer and a product. Central system 200 may be operated by a company, such as assignee Blue Flame Data, Inc., providing trade-off analysis services to manufacturers and/or other clients desiring to obtain consumer preference information.

In operation, central system 200 may use data input by consumers and clients, as well as legacy data, third party data and/or observed behavior data to produce consumer preference information. It should be noted that many other types of computing hardware may be used to perform the functions of central system 200 described herein, including, but not limited to, a server, a workstation, a network, or any combination of one or more of the foregoing. Further details of central system 200 are set forth below with respect to FIG. 4.

In communication with central system 200 are several client devices 300. Client devices 300 according to the present invention may be operated by a product manufacturer to transmit attributes and attribute levels for a given product to central system 200. In response, central system 200 may determine consumer preference information consisting of part worth values associated with each attribute and attribute level. Of course, central system 200 may determine attributes and attribute levels for a given product using data from other sources.

Client devices 300 may also receive information from central system 200 intended for display to a manufacturer or to another client. Such information may include real-time monitoring of consumer answers, scenario simulations, and/or an interface allowing the operator to tweak existing thresholds or parameters while information is being gathered from consumers. Of course, the manufacturer may also use client device 300 to view consumer preference information produced by and received from central system 200.

As shown in FIG. 3, client device 300 may include a server and/or a kiosk. Any other suitable device may be used as client device 300 according to the invention, including but not limited to a workstation, a mainframe computer, and a computer terminal. In the case that client device 300 is a device having its own input and/or output devices, such as a kiosk, a consumer may also use client device 300 to input answers to questions posed in accordance with the invention and to input other indications to central system 200. Accordingly, client device 300 may be used to present an interface to the consumer that allows the consumer to input such information.

Information such as questions and answers may also be transmitted to and/or received from consumers as described above through consumer devices 400. Shown in FIG. 3 are consumer devices 400 represented by a telephone, a personal digital assistant, a workstation, and a pen-based computer. The illustrated connections indicate that the shown consumer devices 400 may communicate with client devices 300, with client devices 300 and central system 200 and, in the case of telephone consumer device 400 or workstation consumer device 400, directly with central system 200. In this regard, consumer devices 400 usable in conjunction with the present invention include any device capable of presenting information to a consumer, visually and/or aurally, and of transmitting an indication made by the consumer to an external device. Of course, consumer devices 400 should be able to communicate with the device or devices with which they are in communication over whatever type of network media exist between the devices.

Although the connections illustrated between the components of FIG. 3 appear dedicated, it should be noted that each of the connections may be shared by other components. Moreover, the connections may comprise one or more of a local area network, a wide area network, a telephone network, a cellular network, a fiber-optic network, a satellite network, an infra-red network, a radio frequency network, or any other type of network which may be used to transmit information between devices. Additionally, the devices shown as in communication with other devices need not be constantly exchanging data, rather, the communication may be established when necessary and severed at other times or always available but rarely used to transmit data.

Central System

Figure 4:
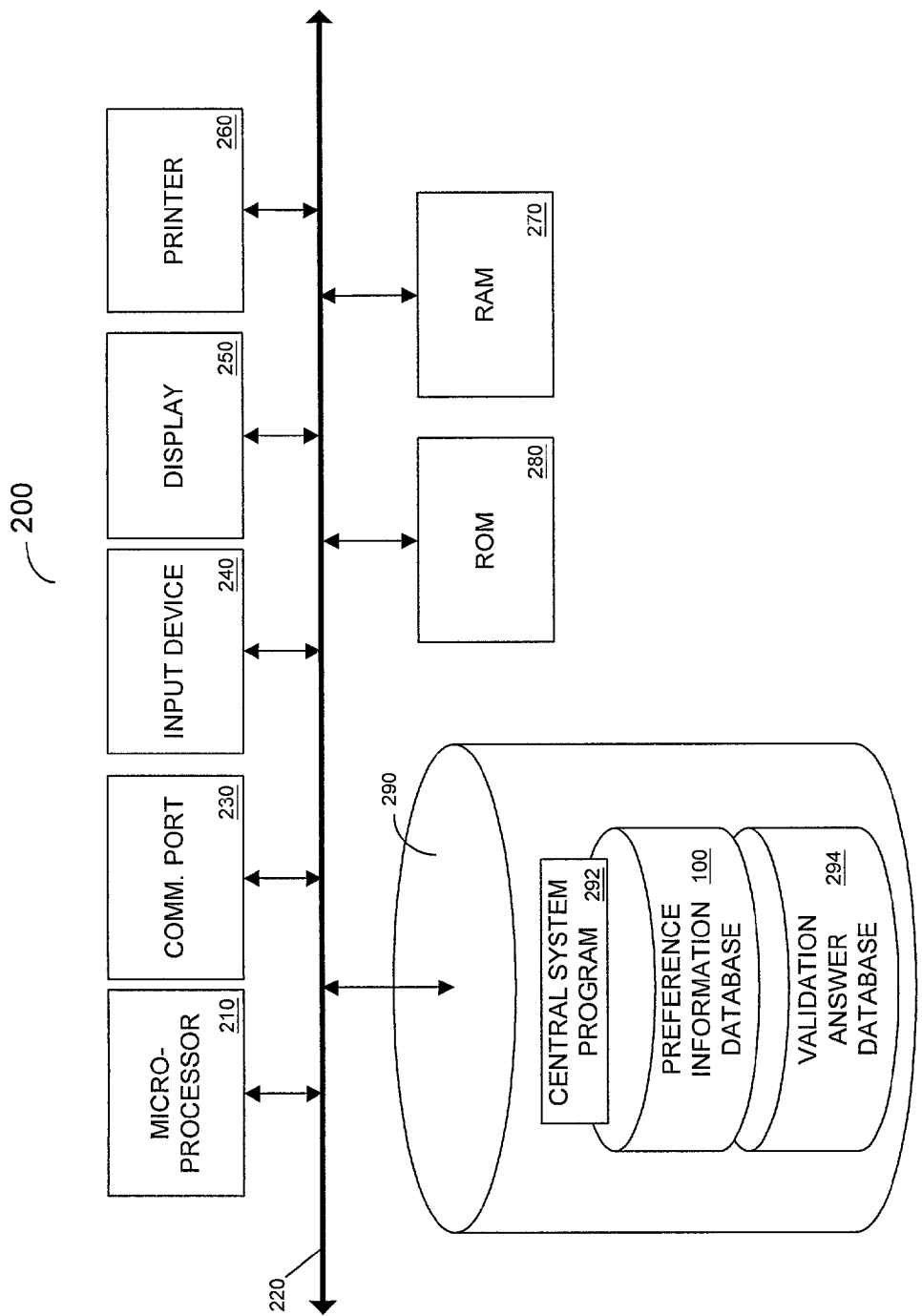
FIG. 4 is a block diagram of an internal architecture of a central system according to embodiments of the present invention.

FIG. 4 is a block diagram of the internal architecture of central system 200 according to embodiments of the invention. As illustrated, central system 200 includes microprocessor 210 in communication with communication bus 220. Microprocessor 210 may be a Pentium™, RISC™-based, or other type of processor and is used to execute processor-executable process steps so as to control the components of central system 200 to provide desired functionality.

Also in communication with communication bus 220 is communication port 230. Communication port 230 is used to transmit data to and to receive data from external devices. Communication port 230 is therefore preferably configured with hardware suitable to physically interface with desired external devices and/or network connections. In one embodiment, questions for consumers are transmitted to and answers are received from consumer devices 400 over communication port 230.

Input device 240, display 250 and printer 260 are also in communication with communication bus 220. Any known input device may be used as input device 240, including a keyboard, mouse, touch pad, voice-recognition system, or any combination of these devices. Input device 240 may be used by an operator to input product-related information such as attributes and attribute levels, consumer-related information such as consumer preference information and contact information, client-related information such as billing and transaction information, and commands to central system 200. In this regard, a command may be input to central system 200 to output a report detailing a particular client's account, a particular consumer's preference information or preference information associated with a plurality of consumers.

Such a report may be output to display 250, which may be an integral or separate CRT display, flat-panel display or the like. Display 250 is used to output graphics and text to an operator in response to commands issued by microprocessor 210. Printer 260 is also an output device, but produces a hardcopy of data using ink-jet, thermal, dot-matrix, laser, or other printing technologies.

RAM 270 is connected to communication bus 220 to provide microprocessor 210 with fast data storage and retrieval. In this regard, processor-executable process steps being executed by microprocessor 210 are typically stored temporarily in RAM 270 and executed therefrom by microprocessor 210. ROM 280, in contrast, provides storage from which data can be retrieved but to which data cannot be stored. Accordingly, ROM 280 is used to store invariant process steps and other data, such as basic input/output instructions and data used during system boot-up or to control communication port 230.

Data storage device 290 stores, among other data, central system program 292 of processor-executable process steps. According to embodiments of the present invention, the process steps of central server program 292 may be read from a computer-readable medium, such as a floppy disk, a CD-ROM, a DVD-ROM, a Zip disk, a magnetic tape, or a signal encoding the process steps, and then stored in data storage device 290. Microprocessor 210 executes instructions of program 292 and thereby operates in accordance with the present invention, and particularly in accordance with the process steps described in detail herein.

Specifically, according to embodiments of the invention, microprocessor 210 executes processor-executable process steps of central system program 292 to provide for determination of preference information associated with a consumer, and mixing of the preference information with preference information associated with a plurality of consumers. The process steps of central system program 292 are also executed according to these embodiments so that a degree to which the preference information associated with the consumer is mixed with the preference information associated with the plurality of consumers is different than a second degree to which second preference information associated with a second consumer is mixed with preference information of a second plurality of consumers.

Also according to embodiments of the invention, the process steps are executed to determine preference information associated with a consumer, to validate the preference information, and to mix the preference information with preference information associated with a plurality of consumers based on the validating step.

The foregoing aspects of the invention advantageously provide mixing that may differ among consumers. Since more appropriate mixing may be achieved than that achieved by previous systems, these aspects provide predictive and useful consumer preference information.

Also included in central system program 292 may be processor-executable process steps to provide a World Wide Web server. Such a Web server would allow central server 200 to communicate with client devices 300 and consumer devices 400 through the World Wide Web. In addition, program 292 may include process steps of an interactive voice response system enabling central system 200 to transmit questions to and receive answers from a consumer using a telephone consumer device 400.

Central system program 292 may be stored in data storage device 290 in a compressed, uncompiled and/or encrypted format. In alternative embodiments, hard-wired circuitry may be used in place of, or in combination with, processor-executable process steps for implementation of the processes of the present invention. Thus, embodiments of the present invention are not limited to any specific combination of hardware and software.

Also stored in data storage device 290 are preference information database 100 and validation answer database 294. Preference information database 100 includes various types of preference information determined according to the present invention. As will be described in more detail below, the types may include "raw" preference information, normalized preference information, and stabilized preference information associated with individual consumers, with subgroups of two or more consumers and/or with segments of two or more consumers. Validation answer database 294 stores answers to trade-off questions presented according to the invention. The answers include actual answers of consumers, answers predicted based on preference information associated with consumers, and answers predicted based on preference information associated with a subgroup of two or more consumers.

Usage of preference information database 100 and validation answer database 294 is described in detail below. As will be understood by those skilled in the art, the tabular illustrations and accompanying descriptions of the databases merely represent relationships between stored information. A number of other arrangements may be employed besides those suggested by the tables shown. Similarly, the illustrated entries of the databases represent sample information only; those skilled in the art will understand that the number and content of the entries can be different from those illustrated.

Data storage device 290 also includes elements that may be necessary for operation of central system 200, such as other applications, data files, an operating system, a database management system and "device drivers" for allowing microprocessor 210 to interface with devices in communication with communication port 230. These program elements are known to those skilled in the art, and are therefore not described in detail herein.

Validation

Figure 5:
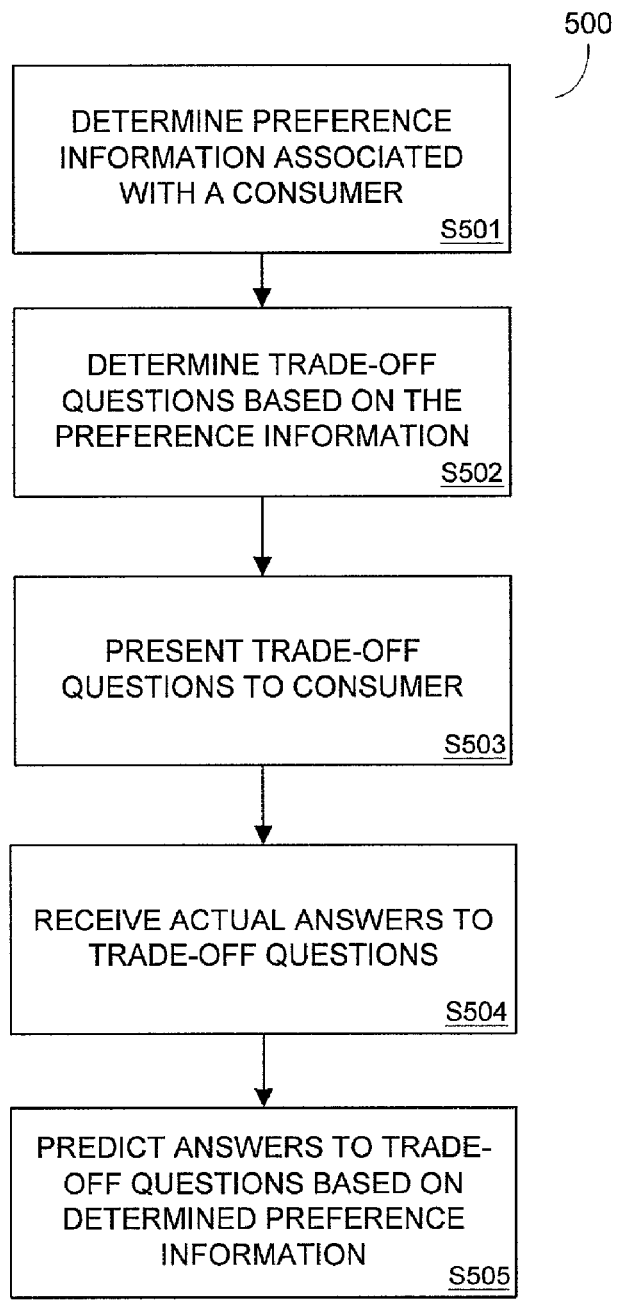
FIG. 5 is a flow diagram of process steps to validate consumer preference information according to embodiments of the present invention.

FIG. 5 is a flow diagram of process steps 500 to validate preference information according to one embodiment of step S2 of process steps 10. Although process steps 10, process steps 500 and the other process steps described herein are described as being performed by central system 200 through execution of processor-executable process steps of central server program 292 by microprocessor 210, the process steps may also be performed, in whole or in part, by one or more of central system 200, client devices 300, consumer devices 400, other devices, and manual means.

Process steps 500 begin at step S501, in which preference information associated with a consumer is determined. As mentioned above with respect to step S1 of process steps 10, preference information may be determined in step S501 using the techniques described in U.S. patent application Ser. No. 09/754,612 or using conventional techniques for determining preference information associated with a consumer. The preference information may also be determined in step S501 simply by receiving the preference information from any source, such as client device 300, or by retrieving stored preference information associated with a consumer of interest. FIG. 6 illustrates a tabular representation of a portion of preference information database 100 storing preference information that may be determined in step S501 and that will be used to describe process steps 500.

After the preference information is determined in step S501, trade-off questions are determined based on the preference information in step S502. In some embodiments, the determined trade-off questions present difficult and relevant choices to the consumer based on the associated preference information. By presenting difficult and relevant choices to the consumer, the predictive precision of the preference information may be better evaluated.

One example for determining trade-off questions is described below, but other systems may be used in accordance with the invention. According to the example, a combination of specific attribute levels of two attributes is referred to as an Object, and a combination of two Objects is referred to as a Pair. Based on the FIG. 6 tabular portion, $550/All Mountain is a first Object, $450/Junior is a second Object, and a Pair may include the Objects $550/All Mountain and $450/Junior.

This embodiment attempts to create eight Pairs in which each Object of a Pair concerns a same two attributes, as in the above example in which both Objects concern the attributes Price and Type. Moreover, for each of the eight Pairs, an attribute level of a first Object of a Pair is associated with a greater part worth value than a corresponding attribute level (an attribute level associated with a same attribute as the attribute level of the first Object) of a second Object of the Pair, while a second attribute level of the first Object of the Pair is associated with a smaller part worth value than the other attribute level of the second Object. The previously-described Pair, $550/All Mountain and $450/Junior, satisfies the foregoing guidelines, because the part worth value associated with All Mountain (1.82) is greater than the part worth value associated with Junior (1.04) and the part worth value associated with $550 (2) is less than the part worth value associated with $450 (4).

The present example uses additional guidelines based on which trade-off questions are determined in step S502. Specifically, a sum of part worth values associated with each attribute level of a first Object of a Pair should be as similar as possible to a sum of part worth values associated with each attribute level of a second Object of the Pair. Also, no one attribute should be represented in more than three pairs, and no one Object should be present in more than two pairs. Each of these additional guidelines is intended to produce trade-off questions that thoroughly test the predictive precision of the preference information.

According to another particularly inventive additional guideline, Applicants have discovered benefits resulting from identifying those Pairs in which the sum of each part worth value of a Pair is largest and creating trade-off questions based on those Pairs. Such trade-off questions are believed to thoroughly test the predictive precision of the preference information by dealing with topics in which the responding consumer is most interested.

One specific method for determining trade-off questions according to the foregoing guidelines is hereafter described. According to the specific method, a matrix is created in which each row represents an attribute level of one attribute and each column represents an attribute level of a second attribute, with the attribute levels ordered from most to least preferred. Stored in each cell of the matrix is a sum of part worth values associated with the attribute levels representing the row and column to which the cell belongs. Moreover, each cell represents an Object consisting of the attribute levels representing the row and column to which the cell belongs.

Matrix 700 of FIG. 7 is an example of the above-described matrix created based on the data of FIG. 6. The sums associated with the attribute level $750 are shown as "N/A" in matrix 700 because $750 is an unacceptable attribute level. According to this specific method, a matrix such as matrix 700 is created for every possible combination of two attributes. In the present example, matrices are created for the combinations color/price (matrix 700), color/brand, color/type, price/brand, price/type, and brand/type. In other embodiments, matrix 700 is only created for combinations of highest-ranked attributes. Also, according to some embodiments, matrix 700 is populated only with highest-ranked attribute levels.

Each matrix is examined to identify Pairs of Objects for which an attribute level of a first Object is associated with a greater part worth value than a corresponding attribute level of a second Object, while a second attribute level of the first Object is associated with a smaller part worth value than the other attribute level of the second Object. One method for such identification includes selecting a cell in the matrix. Next, each cell "northeast" of the selected cell is identified. Accordingly, the Object represented by the selected cell can be paired with the object represented by any of the identified cells to create a Pair satisfying the foregoing criteria.

For all such Pairs identified from each matrix, the difference in the summed part worth values representing each Object of a Pair is calculated. For example, in the case of the Pair consisting of Objects Yellow/$450 and Blue/$550, the calculated difference based on matrix 700 equals 4.8. Next, each Pair for which the calculated difference is greater than two is discarded. The remaining Pairs are then ranked according to the sums of all the part worth values associated with their Objects, with the Pair having the highest sum being ranked first. If the sums corresponding to two Pairs are equal, the Pair having the smallest difference in the summed part worth values representing each Object is ranked above the other Pair.

Eight Pairs are then selected from the top of the ranked list. If one attribute is represented more than three times among the eight Pairs, the lowest-ranking Pair(s) of the selected Pairs which represent the attribute is ignored and a next-ranked Pair is selected. If less than eight Pairs are selectable, the selection is repeated with an attribute being allowed to be represented no more than four times. If less than eight Pairs are again selected, selection re-occurs with an Object being allowed to be chosen up to three times. If still less than eight Pairs are chosen, all Pairs for which the calculated difference was three or less are re-ranked and selection of the re-ranked Pairs proceeds as described above.

Once the eight Pairs are selected, trade-off questions are determined therefrom. FIG. 8 illustrates a tabular representation of a portion of validation answer database 294 including Pairs selected according to step S502. As shown, each row represents a selected Pair and therefore also represents a trade-off question. For example, trade-off question 1 requires a consumer to compare his preference for a $550 All Mountain downhill ski with his preference for a $450 Junior downhill ski. The trade-off questions are stored and presented to a consumer in random order, with the Objects of each Pair also randomly appearing as first or second Objects in a Pair.

Each trade-off question represented in validation answer database 294 is associated with fields for specifying an actual preference intensity, a predicted preference intensity, and a predicted subgroup preference intensity. Use of these latter three fields is described in detail below.

Many systems other than those described above may be used to determine trade-off questions according to step S502. These systems may use any number of the above principles and techniques.

Figure 9:
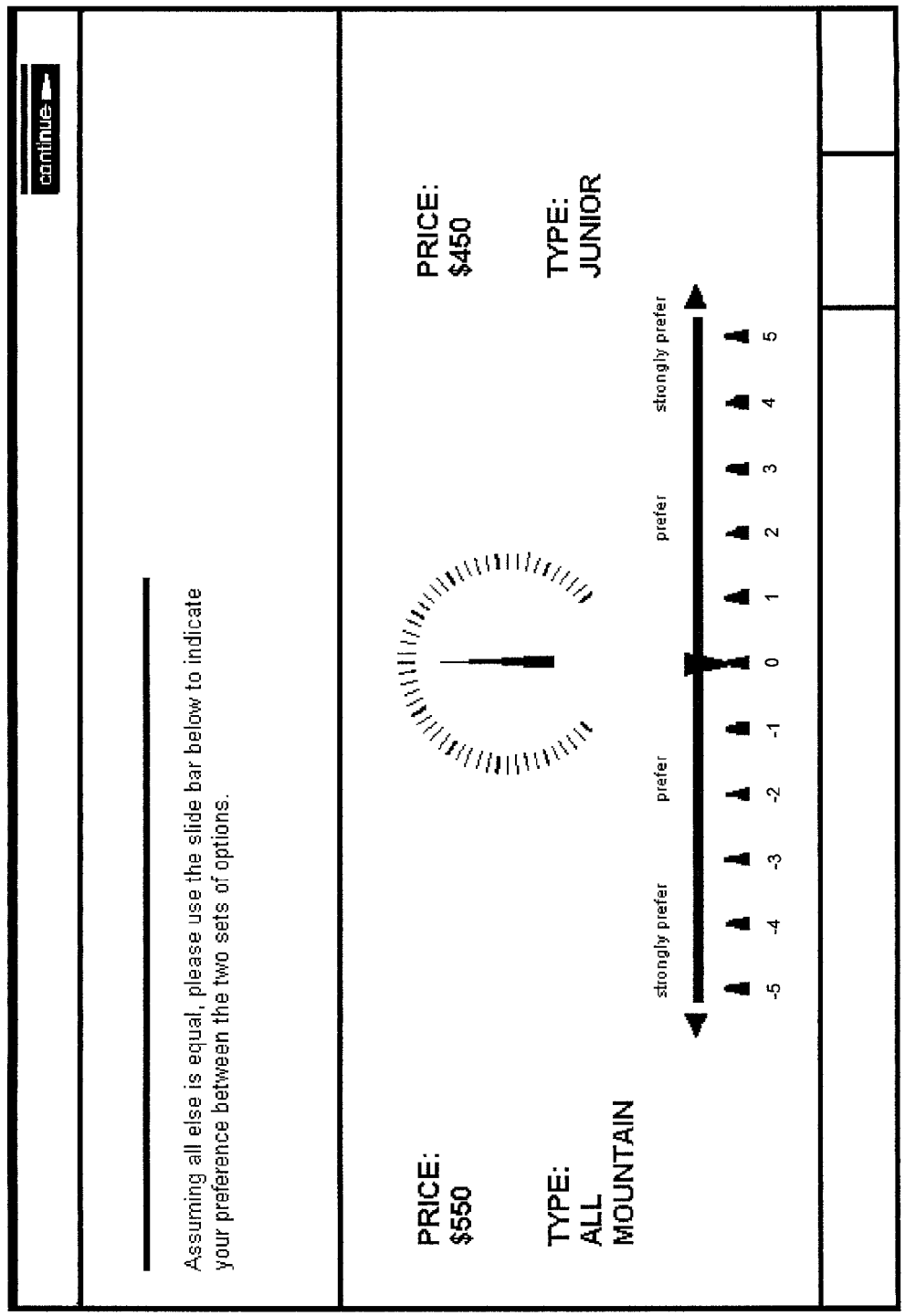
FIG. 9 is a view of an interface used to present trade-off questions to a consumer according to embodiments of the present invention.

Returning to process steps 500, the trade-off questions determined in step S502 are presented to a consumer in step S503. The consumer to whom the questions are presented is preferably the consumer associated with the preference information determined in step S501. The questions may be presented by transmitting data to client device 300, consumer device 400, or another device operated by the consumer, by creating a hardcopy questionnaire to be mailed to the consumer, or by using any other known means of presenting information. FIG. 9 illustrates one embodiment for presenting trade-off questions according to step S503. According to the illustrated embodiment, data representing trade-off question 1 of validation answer database 294 is transmitted to consumer device 400 and displayed by a display device thereof.

After the trade-off questions have been presented to the consumer, actual answers to the trade-off questions are received in step S504. In this regard, the actual answers may be transmitted by consumer device 400 and received by communication port 230 of central system 200, input by an operator operating input device 240 of central system 200, or received by other means. The actual answers according to the present example comprise currency-normalized preference intensities.

As shown in FIG. 9, the consumer is asked to indicate a preference intensity for one Object over another Object. In response, the consumer operates consumer device 400 to indicate a preference intensity and to transmit the preference intensity to central system 200. Upon receipt of the preference intensity, the preference intensity may be currency-normalized by multiplying it with a conversion factor associated with the consumer's preference information, and then stored in association with the appropriate trade-off question in the actual preference intensity field of validation answer database 294. Therefore, if the sliding bar of FIG. 9 is moved to the "−3" indicator and if the conversion factor equals $50/util, the actual preference intensity is −150. This scenario is reflected in the first illustrated record of validation answer database 294. Of course, this process is repeated for each of the determined trade-off questions. Currency-normalization is discussed in more detail below.

In step S505, answers to the trade-off questions are predicted based on the preference information determined in step S501. In one embodiment of step S505, the answers are predicted by subtracting the sum of part worth values associated with Object 1 of a trade-off question from the sum of part worth values associated with Object 2 of the trade-off question. Using trade-off question 1 of FIG. 8 and the part worth values shown in FIG. 6 as an example, a predicted, non-currency-normalized preference intensity according to this embodiment is equal to (2+1.82)−(4+1.04)=−1.22. After step S505, the predicted preference intensities are currency-normalized and stored in association with appropriate trade-off questions in the predicted preference intensity field of validation answer database 294.

Stabilization

Figure 10:
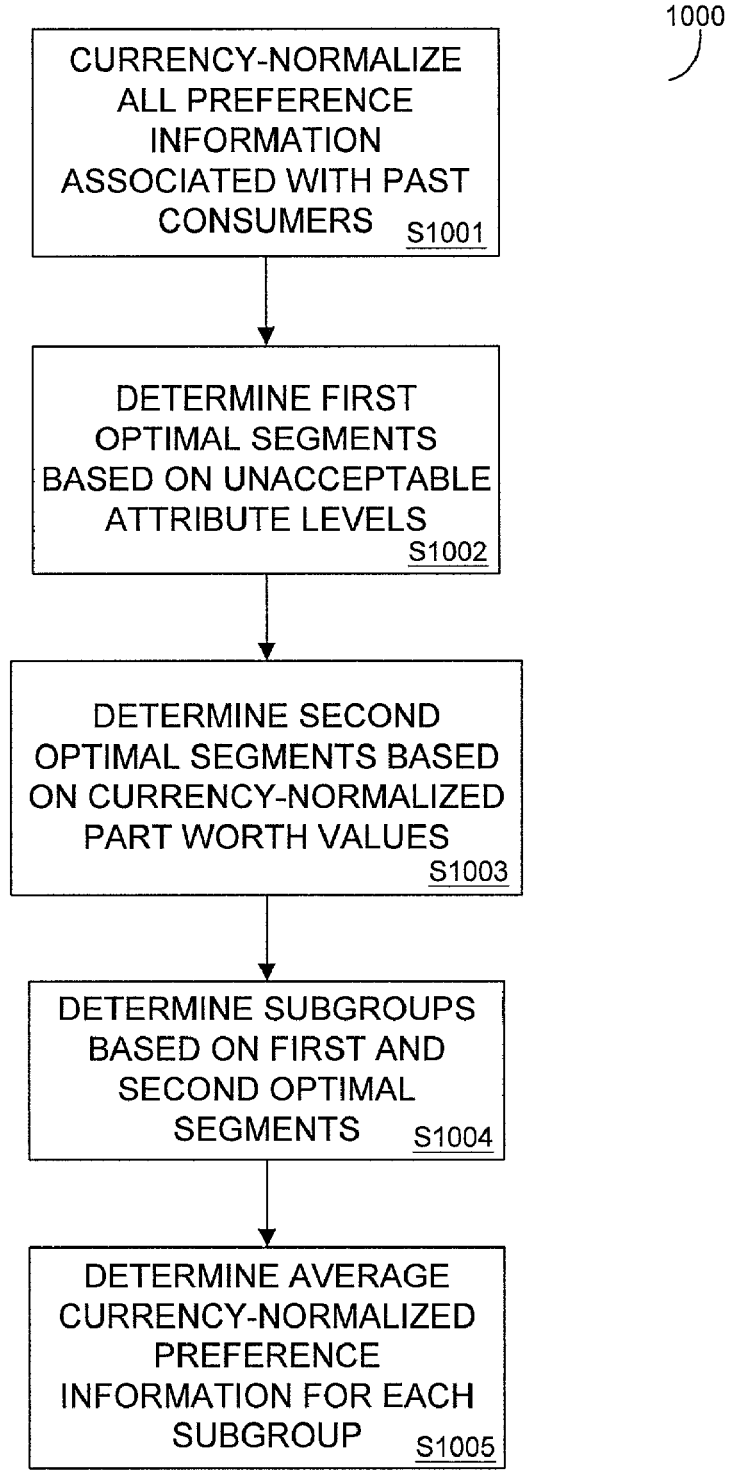
FIG. 10 is a flow diagram of process steps to determine preference information associated with a plurality of consumers according to embodiments of the present invention.

According to the present invention, stabilization refers to the mixing of preference information associated with a consumer with preference information associated with a plurality of consumers to produce mixed preference information. As described with respect to process steps 10, stabilization follows validation according to one embodiment of the invention. One example according to this embodiment is set forth in process steps 1000 of FIG. 10 and process steps 1300 of FIG. 13.

In the particular embodiment described below, the plurality of consumers includes all past consumers for whom associated preference information is stored in preference information database 100. In other embodiments, the plurality of consumers includes a predetermined number of past consumers, such as the last five thousand consumers for whom associated preference information was stored in preference information database 100. The plurality of consumers may also include all consumers for whom associated preference information was stored in preference information database 100 during a particular time period.

According to process steps 1000, all preference information associated with past consumers is currency-normalized in step S1001. Currency-normalization is performed because of the impossibility in comparing raw preference information associated with one consumer to raw preference information associated with another consumer or consumers. Comparison is impossible because individual consumers have individual opinions on the weight of values in a scale. In other words, a first consumer may assign a preference value of 8 to an attribute level, while a second consumer who equally prefers the attribute level may assign a preference value of 6. In order to allow these comparisons and to establish a consistent relationship between the preference information associated with each of the past consumers, the present inventors have discovered that part worth values of each set of preference information associated with past consumers should be calibrated to a scale based on currency. This discovery takes advantage of the realization that relative preferences for different amounts of currency will not vary widely among a group of consumers. It should be noted that other systems for normalizing the preference information associated with the past consumers may be used in step S1001, such as systems using a purchase likelihood scale.

In order to currency-normalize preference information according to the present embodiment, each set of preference information associated with past consumers is first obtained from preference information database 100. In this regard, preference information database 100 stores preference information associated with individual past consumers in addition to the consumer for whom preference information was determined in step S501. Next, each part worth value in a given set of preference information associated with an individual past consumer is multiplied by the following conversion factor:

$$\frac{\text{abs}(\text{Price max} - \text{Price min})}{\text{abs}(\text{part worth value for Price max} - \text{part worth value for Price min})}.$$

For example, the conversion factor corresponding to the raw preference information of FIG. 6 is equal to abs[($650−$450)/(0 utils−4 utils)]=$50/util. Each part worth value in the given set of preference information is multiplied by the conversion factor in order to produce currency-normalized preference information. FIG. 11 shows the preference information of FIG. 6 after currency-normalization as described above. The currency-normalized preference information is stored in preference information database 100, with identification field 110 specifying that the associated preference information has been currency-normalized.

It should be noted that different conversion factors may be used to currency-normalize different sets of preference information because the conversion factor for a given set of preference information is based on part worth values included in the given set of preference information. Moreover, a conversion factor according to the present invention may comprise a constant or an equation such as a distribution, piecewise function, or the like.

After each set of preference information associated with the individual past consumers is currency-normalized, first optimal segments are determined based on unacceptable attribute levels in step S1002. More specifically, the past consumers are grouped into segments based on attribute levels that the past consumers indicated as being acceptable and unacceptable. Grouping on this basis is intended to ensure that consumers in a segment are associated with similar preference information with respect to acceptable and unacceptable attribute levels.

The first optimal segments may be determined in step S1002 using traditional cluster analysis (k-means method) or mixture models. If mixture models are used in step S1002, a binomial distribution may be used for segment densities.

Detailed algorithm No. 1, set forth after the present Detailed Description, describes a system for performing stabilization according to one specific embodiment of the invention. Step 1 of the algorithm corresponds to step S1002 of process steps 1000. As will be understood after considering the algorithm, step 1 describes a method in which latent cluster analysis is initially performed assuming two segments of past consumers. According to step 1, latent cluster analysis is then repeatedly performed assuming different numbers of segments.

After latent cluster analysis, a procedure known as CAIC scoring is used to determine which of the assumed number of segments is optimal. In this regard, fit of the segments to past consumer preference information becomes more accurate as the number of segments increases, but the number of parameters that must be estimated also increases. CAIC scoring considers both of these effects in determining the first optimal segments. Once the first optimal segments are determined, a probability that each past consumer belongs to each of the optimal segments is determined and stored.

In step S1003, second optimal segments are determined based on part worth values of the preference information that was currency-normalized in step S1001. Step S1003 is intended to group consumers having similar part worth values associated with acceptable attribute levels. Accordingly, in one embodiment of step S1003, unacceptable attribute levels are ignored. In another embodiment, grouping is based on the belief that a consumer associated with a part worth value of 5 for an attribute level is more similar to a consumer for whom the attribute level is unacceptable than is a consumer associated with a part worth value of 10 for the attribute level.

As described with respect to step S1002, the determination of second optimal segments may be performed using traditional k-means analysis or using mixture models. In some embodiments using mixture models, standard normal densities are assumed. If using a traditional analysis, ignoring the unacceptable attribute levels results in a "distance measure" between a consumer and a "cluster center" that is based on currency-normalized part worth values associated with acceptable attribute levels. If using mixture models, a density value corresponding to the unacceptable attribute levels is ignored.

Step 2 of detailed algorithm no. 1 sets forth one specific system for performing step S1003 using latent cluster analysis. According to step 2, latent cluster analysis is performed by assigning, for each set of preference information associated with past consumers, acceptable attribute levels to their associated part worth value and ignoring unacceptable attribute levels.

Step 2 continues similarly to step 1 of detailed algorithm no. 1, with latent cluster analysis being initially performed assuming two segments of past consumers and then repeatedly performed assuming different numbers of segments. CAIC scoring is then used to determine which of the assumed number of segments is optimal based on results of the latent cluster analyses. As a result of step 2, a probability that each past consumer belongs to each of the second optimal segments is determined and stored.

It should be noted that systems other than CAIC scoring may be used to determine an optimal number of segments in accordance with the present invention. Detailed algorithm no. 2, set forth after detailed algorithm no. 1, demonstrates a system using for determining an optimal number of segments based on entropy and CAIC scoring.

Subgroups are determined based on the first and second optimal segments in step S1004. For example, it is assumed that four optimal segments (A,B,C,D) are determined in step S1002 and three optimal segments (I,II,III) are determined in step S1003. Twelve possible subgroups (AI,AII,AIII,BI,BII, BIII,CI,CII,CIII,DI,DII,DIII) are identifiable based on these segments. One embodiment of step S1004 is set forth in step 3 of detailed algorithm no. 1. It should be noted that the number of subgroups may vary. Detailed algorithm no. 1 presents an example including four subgroups.

In another embodiment of steps S1002 through S1004, first optimal segments are determined (e.g., A,B,C) and second optimal segments are determined based on the first optimal segments. According to one example of this embodiment, the subgroups determined in step S1004 are subgroups AI, AII, BIII, BIV, BV, CVI, and CVII.

Next, in step S1005, average currency-normalized preference information is determined for each subgroup determined in step S1004. Step 4 of detailed algorithm no. 1 illustrates one embodiment of step S1005. Generally, currency-normalized part worth values of all past consumers in a subgroup are identified, and those part worth values that are associated with a particular attribute level are averaged to determine an average currency-normalized part worth value for the particular attribute level. Then, part worth values that are associated with each other particular attribute level are averaged to determine an average currency-normalized part worth value for each other particular attribute level. The process is repeated for each subgroup.

FIG. 12 illustrates a tabular portion of preference information database 100 storing average currency-normalized preference information for subgroup D2 determined according to step S1005. As shown, identification field 110 specifies that the information is associated with a particular subgroup and that the preference information has been currency-normalized.

It should be noted that, according to some embodiments, process steps 1000 are performed periodically in order to maintain an up-to-date set of subgroups and associated average preference information. For example, subgroups may be re-determined every three weeks, whenever preference information for one thousand new consumers is received, or according to some other criteria. In other embodiments, process steps 1000 are performed each time stabilized preference information associated with a consumer is desired. As a result of the re-determination of subgroups, two past consumers may each be associated with a same subgroup prior to a re-determination and associated with respective different subgroups after the re-determination.

Figure 13:
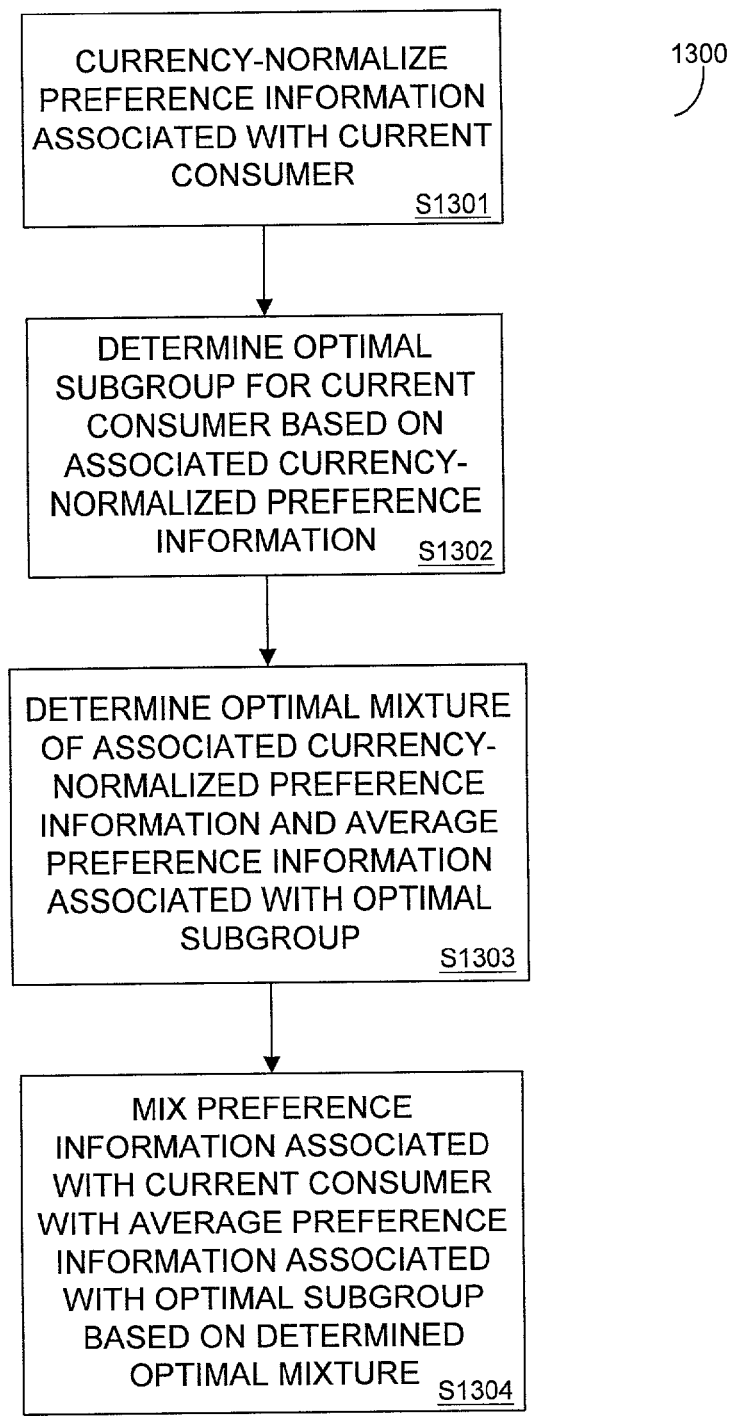
FIG. 13 is a flow diagram of process steps to mix preference information associated with a consumer with preference information associated with a plurality of consumers according to embodiments of the present invention.

FIG. 13 is a flow diagram of process steps 1300. In some embodiments, process steps 1300 are performed each time stabilized preference information associated with a consumer is desired. As mentioned above, process steps 1300 may be performed separately from periodic performances of process steps 1000 or in conjunction with process steps 1000 as a single process to produce preference information associated with a particular consumer.

Flow begins at step S1301, in which preference information associated with a consumer is currency-normalized. Currency-normalization may proceed as described with respect to step S1001, and produces preference information such as that illustrated in FIG. 11. Of course, FIG. 11 was described previously as illustrating currency-normalized preference information associated with a past consumer. In the present instance, it is assumed that the consumer represented in FIG. 11 is a "current" consumer, i.e., a consumer for which associated stabilized preference information is to be produced.

In step S1302, an optimal subgroup to which the consumer belongs is determined based on the preference information that was currency-normalized in step S1301. Step 5.1 of detailed algorithm no. 1 describes a particular method for determining the optimal subgroup based on similarities between the consumer's unacceptable/acceptable attribute levels and on similarities between currency-normalized part worth values associated with the consumer and those associated with the subgroup.

An optimal mixture of the preference information produced in step S1301 and the average preference information of the optimal subgroup determined in step S1005 is determined in step S1303. According to one embodiment, the determination of step S1303 is based on the actual answers to the trade-off questions provided by the current consumer and the answers predicted based on the current consumer's preference information in step S505. Moreover, the determination is based on answers to the trade-off questions predicted based on the average currency-normalized preference information of the optimal subgroup. Accordingly, the latter answers are predicted based on the average currency-normalized preference information of the optimal subgroup as described in step S505. As shown in FIG. 8, each of these types of answers may be stored in validation answer database 294 for convenient reference and retrieval. Step 5.2 of detailed algorithm no. 1 sets forth one system for determining an optimal mixture according to this embodiment.

Lastly, in step S1304, the currency-normalized preference information associated with the current consumer is mixed with the average currency-normalized preference information associated with the optimal subgroup according to the optimal mixture. In one embodiment of step S1304, each part worth value of the consumer's preference information is mixed with a corresponding part worth value of the subgroup's preference information according to the optimal mixture. A method according to this embodiment is described in step 5.3 of detailed algorithm no. 1.

FIG. 14 is a tabular representation of a portion of preference information database 100. As specified by identification field 110, the portion includes preference information associated with a particular consumer and stabilized in accordance with the present invention.

It may be determined in step S1303 that the optimal mixture is equal to 100% of the current consumer's preference information and 0% of the subgroup's preference information. In these instances, mixing the current consumer's preference information with the subgroup's preference information does not produce more predictive preference information than that determined in step S501. More specifically, the currency-normalized preference information of the current consumer is identical to the stabilized preference structure of the current consumer.

FIG. 15 is a view of preference information 1500 as presented to a client according to embodiments of the present invention. More particularly, preference information 1500 is a matrix of currency-normalized part worth values and associated attribute levels stabilized according to the present invention. Preference information 1500 is intended to provide a client with a comprehensible breakdown of preference information associated with a particular consumer and determined according to the present invention. Preference information 1500 may be presented to a client in many ways, including by transmitting data representing preference information 1500 to client device 300, by transmitting a Web page including preference information 1500 to client device 300, by displaying preference information 1500 to the client using display 250, and by providing to the client a hardcopy of preference information 1500 produced using printer 260. As shown, preference information 1500 reflects the data stored in the portion of preference information database 100 represented in FIG. 14.

A client may determine an offer based on preference information 1500. In a particularly advantageous embodiment, the offer is then provided to the consumer associated with preference information 1500. Such a personalized offer may be more likely to be accepted and may generate more profit than an offer designed for the general public. In some embodiments, a stabilized preference structure such as preference information 1500 is used to calculate other useful information such as an optimal product selected from a product line.

Although the present invention has been described with respect to particular embodiments thereof, those skilled in the art will note that various substitutions may be made to those embodiments described herein without departing from the spirit and scope of the present invention.

Detailed Algorithm No. 1
N=a total number of attribute levels that are either acceptable or unacceptable to a consumer.
n=a specific attribute level, n=1, . . . , N
I=a total number of segments
i=a specific segment, I=1, . . . , I
R=a total number of consumers in all segments
r=a number identifying a specific consumer, r=1, . . . , R
Si=a number of consumers in segment i.
s=a specific consumer of segment i, s=1, . . . , Si
→=vector
$\| \|$=matrix $\Sigma k$=summation over the variable k
$\Pi k$=multiplication over the variable k 1. Determine First Optimal Segments Based on Unacceptable Attribute Levels
1.1 Latent Cluster Analysis
$\|Y\|$=a matrix that corresponds to a particular set of preference information associated with each consumer r.
$\|Y\|=\{Y1\rightarrow, Y2\rightarrow, \ldots, YR\rightarrow\}$
$Yr\rightarrow=(Y1,r)$
( · )
( · )
( · )
(YN,r)

The following table illustrates a set of raw part worth values associated with hypothetical past consumer r=33.

| Attribute 1 | 2 | 3 | 4 |
|---|---|---|---|
| unacceptable level | 7 | 10 | 5 |
| 0 | 4 | 4 | 2 |
| 6 | 3 | 0 | 0 |
| no level | 0 | 1 | 6 |

If a level n is unacceptable to the consumer, then $Yn,r=0$. If the level n is acceptable to the consumer, $Yn,r=1$. Accordingly, the above set of part worth values corresponds to $Y33\rightarrow=\|0\ 1\ 1\ 1\ 1\ 1\ 1\ 1\ 1\ 1\ 1\ 1\ 1\ 1\ 1\|'$ (the single quote denotes a conversion from row vector to column vector). Note that the last row corresponding to Attribute 1 is ignored because Attribute 1 has only three levels.

1.1.1 Perform Latent Cluster Analysis Assuming l=2 Segments

As an initial condition for the latent cluster analysis, randomly distribute the past consumers among the 2 segments. For example, begin with the following random initial conditions:
r=r1, r2, r15, . . . are in segment i=1 and r=r3, r4, r22, . . . are in segment i=2.
1.1.2 Calculate $\|\Theta\|$
$\|\Theta\|=(\theta 1\rightarrow, \ldots \theta 1\rightarrow)$
$\theta i\rightarrow=(\theta i,1)$
( · )
( · )
( · )
$(\theta i, N)$,
where $\theta i,n=(\Sigma r\ Yi,n,r*\text{Ind}\ i,r)/Si$, where Ind $i,r$=an indicator function that equals 1 if a consumer r belongs to segment i, but which equals 0 if consumer r does not belong to segment i. Accordingly, the summation is performed only for those consumers that belong to segment i.

The following table illustrates the calculation of $\theta 1\rightarrow$, assuming that consumers r=1, r=2, etc. belong to segment 1.

| Y1→ | Y2→ | Y15→ | Y . . . → | $\theta 1\rightarrow$ = average of Y values for consumers of segment 1 |
|---|---|---|---|---|
| 1 | 1 | 1 | . . . | .12 |
| 1 | 1 | 1 | . . . | .03 |
| 1 | 1 | 1 | . . . | .25 |
| 1 | 1 | 1 | . . . | 1 |
| 1 | 1 | 1 | . . . | .25 |

-continued

| Y1→ | Y2→ | Y15→ | Y...→ | $\theta1\rightarrow$ = average of Y values for consumers of segment 1 |
|---|---|---|---|---|
| 1 | 1 | 1 | ... | .12 |
| 0 | 1 | 1 | ... | 0.5 |
| 1 | 1 | 1 | ... | 0.5 |
| 1 | 1 | 0 | ... | .06 |
| 1 | 1 | 1 | ... | .03 |
| 1 | 1 | 1 | ... | .06 |
| 1 | 1 | 1 | ... | .06 |
| 0 | 1 | 1 | ... | 0.5 |
| 1 | 1 | 1 | ... | .06 |
| 1 | 1 | 0 | ... | .03 |

Next, $\theta2\rightarrow$ is calculated using the Yn,r values of the members of segment 2.

1.1.3 Calculate ||f||
||f||=f1,1→, f2,1→, f1,2→, f2,2→, ..., fI,R→
There are (R)*(I), f i,r→ vectors:
fi,r→=(fi,1,r)
...
(fi,N,r),
where fi,n,r=[($\theta$i,n)^Yn,r]*(1-$\theta$i,n)^(1-Yn,r)
The following table illustrates an example of the calculation of fi,r→.

| f1, 1→ = f→ for r = 1 of S1 = ($\theta1\rightarrow$ ^ Y1→) * ((1→ - $\theta1$→)^(1→ - Y1→)) |
|---|
| 0.12 |
| 0.03 |
| 0.25 |
| 1.00 |
| 0.25 |
| 0.12 |
| 0.50 |
| 0.50 |
| 0.06 |
| 0.03 |
| 0.06 |
| 0.06 |
| 0.50 |
| 0.06 |
| 0.03 | where 1→ is an identity vector.

Again assuming 2 segments and R consumers, also calculate f2,1→, f1,2→, f2,2→, f1,3→, f2,3→, f1,4→, f2,4→, f1, ... →, f2, ... →, f1,R→, and f2,R→.

1.1.4 Calculate F→
F→=[F1,1, F2,1, F1,2, F2,2, ..., FI,R]
Fi,r is a value based upon fi,n,r. There are (R)*(I) Fi,r values. Fi,r=the product of the components of fi,r→. Fi,r=(f i,1,r)*(fi,2,r)*(fi,3,r)* ... *(f i,N,r). For example, (F1,1)= 0.12*0.03* ... *0.03=6.56*10^(-13)

Again assuming 2 segments and R consumers, also calculate F2,1, F1,2, F2,2, F1,3, F2,3, F1,4, F2,4, F1, ... , F2, ..., F1,R, and F2,R.

1.1.5 Calculate Posterior Probability P→
P→=[P1,1 P2,1 P1,2 P2,2 ... PI,R]
Pi,r=the probability that consumer t belongs to segment i. There are (R)*(I) posterior probability values. Pi,r=(Si*Fi,r)/($\Sigma$i Si*Fi,r)
As an example, assume (F2,1)=7.11*10^(-11), I=2. Accordingly, (P1,1)=(S1*F1,1)/[(S1*F1,1)+(S2*F2,1)]= (S1*6.56*10^(-13))/[S1*6.56*10^(-13)+S2*7.11*10^(-11)]=9.14*10^(-3).

Because there are only two segments and the probability that r=1 belongs to either segment 1 or segment 2 equals 1, and (P1,1)≈0, then (P2,1)≈1. Accordingly, the probability that r=1 belongs to segment 1 is approximately 0 while the probability that C1 belongs to segment 2 is approximately 1. Next, calculate the following assuming there are 2 segments and R consumers: (P1,2); (P2,2); (P1,3); (P2,3); (P1,4); (P2,4); (P1, ... ); (P2, ... ); (P1, R); and (P2, R).

1.1.6 Calculate the Likelihood L
There is one L value. L=$\Sigma$i,r (ln(Fi,r)*Pi,r)
For example, assume:
(F1,1)=6.56*10^(=13)
(F2,1)=7.11*10^(~11)
(P1,1)=9.14*10^(-3)
Therefore, $$L=\ln((6.56*10^{(-13)}))*(9.14*10^{(-3)})+\ln((7.11*10^{(-11)}))*(\ldots)+\ldots+=0.94.$$

1.1.7 Iteration
Repeat steps 1.1.3 thru 1.1.6 in an iterative fashion until the posterior probabilities substantially converge, e.g., abs(Pi,r for iteration j−Pi,r for iteration j−1)<0.005.

1.1.7.1 Calculate New ||Θ||=($\theta$1→, ..., $\theta$I→)
Instead of using the ||Θ|| formula of step 1.1.2 use the following formula for $\theta$i→ for all repetitions of steps 1.1.3 through 1.1.6 until iteration ends.
$\theta$1,n=[$\Sigma$r (P1,r*Yn,r)][$\Sigma$r(P1,r)]

$$\theta i \rightarrow = \{\Sigma r(Pi, r * Y1, r)/[\Sigma r(Pi, r)]$$
$$\ldots$$
$$\Sigma r(Pi, r * YN, r)/[\Sigma r(Pi, r)]\},$$

where Pi,r and Yn,r are values from an immediately previous iteration.
For example, assume:
(P1,1)=9.14*10^(-3)
(Y1,1)=1
(Y1,2)=1
(Y1, ...)= ...
(Y1, ...)= ...
...
Therefore,
$\theta$1,1=((9.14*10^(-3))*1+ ... *1+ ... )/(9.14*10^(-3)+ ... )=0.23.
Repeat for all N rows of the vector to obtain $\theta$1→. Next, repeat to obtain $\theta$2→.

1.1.8 Ensure Global Maximum
Repeat steps 1.1.1 thru 1.1.7 using a new set of initial conditions. For example, try new random initial conditions specifying that r=1, r=3, r=15, ... are in segment i=1 and r=2, r=4, r=22, ... are in segment i=2.

1.1.9 Repeat for Other Numbers of Segments I
1.1.1 thru 1.1.8 were performed above for I=2. Perform steps 1.1.1 thru 1.1.8 for I=1, for I=3, I=I, etc.

1.2 CAIC Scoring
1.2.1 Calculate a CAIC Score for I=2 Segments
Identify the final L (likelihood) of each of the 2 iterations. Take the final L that is greater of the two. Also take the final posterior probabilities that correspond to that final, highest L. Using these values, CAIC=(−2)*(ln L)+(N)*(I)*(ln R).

1.2.2 Calculate a CAIC Score for All Other Numbers of Segments I
Identify the minimum CAIC score of the CAIC scores for all other numbers of segments I, as well as I=0. This score corresponds to the first optimal number of segments for the unacceptable latent cluster analysis. For example, if the CAIC scores corresponding to 2, 3 and 4 segments are 40.3, 60.6 and 80.4, respectively, then the first optimal number of segments is 2.

2. Determine Second Optimal Segments Based on Currency-Normalized Part Worth Values 2.1 Latent Cluster Analysis $\|Y\|$=a matrix that corresponds to a set of preference information for each consumer.

$\|Y\|=\{Y1\rightarrow, Y2\rightarrow, \ldots, YR\rightarrow\}$

Each level of $Yr\rightarrow$ corresponds to the currency-normalized part worth value ($PW) of the associated attribute level for consumer r. However, if the associated attribute level is unacceptable, the associated attribute level is ignored.

2.1.1 Perform Latent Cluster Analysis Assuming I=2 Segments

As an initial condition for the latent cluster analysis, randomly distribute the consumers among the I=2 segments. For example, begin with the random initial conditions that r=1, r=2, r=15, ... are in segment i=1 and r=3, r=4, r=22, ... are in segment i=2.

2.1.2 Calculate $\|M\|$ $\|M\|=\{Mi=\}=\{M1\rightarrow, M2\rightarrow\}$, if I=2

$Mi,n=(\Sigma t\,Yn,r*Ind)/Si$ $Mi\rightarrow=(\Sigma t\,Yr\rightarrow*Ind)/Si$

| Y1→ = $PW of r = 1 | Y2→ = $PW of r = 2 | Y15→ = $PW of r = 15 | Y ... → = $PW of r ... | M1→ = average $PW of i = 1 |
|---|---|---|---|---|
| 240 | 0 | 12 | ... | 101 |
| 0 | 112.5 | 312 | ... | 45 |
| 180 | 375 | 202 | ... | 222 |
| 300 | 300 | 324 | ... | 311 |
| 150 | 225 | 223.5 | ... | 214 |
| 0 | 112.5 | 456 | ... | 202 |
| unaccep. level | 0 | 47 | ... | 78 |
| 150 | 112.5 | 34.6 | ... | 111 |
| 0 | 0 | 1023 | ... | 444 |
| 120 | 300 | 233 | ... | 211 |
| 180 | 75 | 231 | ... | 311 |
| 0 | 75 | 65.8 | ... | 56 |
| unaccep. level | 112.5 | 0 | ... | 92 |
| 180 | 0 | unaccep. level | ... | 22 |
| 270 | 37.5 | 122 | ... | 111 |

Note that, n=7 is an unacceptable attribute level for r=1. The corresponding cell in the table above is therefore ignored in the calculation of the numerator and the denominator of M1,7. Next, calculate M2→.

2.2.3 Calculate σ

$\sigma=[\sigma i)^2]=[(\sigma 1)^2(\sigma 2)^2]$, if I=2.

$(\sigma 1)^2$ = the square of the variance of segment $i = 1$ $= \sum$ of the variance of $n = 1$ through $n = N$ of segment 1

$= \{[1/(Si)]*[\Sigma r[Ind*(Y1, r - M1, 1)^2]] +$ $[1/(Si)]*[\Sigma r[Ind*(Y2, r - M1, 2)^2]] + \ldots +$ $[1/(Si)]*[\Sigma r[Ind*(YN, r - M1, N)^2]]\}*\{1/N\}$ Similarly, calculate σ2.

2.1.4 Calculate F→

Fi,r is a value based upon fi,n,r. There are (R)*(I) Fi,r values.

$F\rightarrow=(F1,1, F2,1, F1,2, F2,2, \ldots, FI,R)$.

$(F1,1) = \prod n[1/((2*pi*(\sigma 1)^2)^{\wedge}.5)]*$ $\quad [e^{\wedge}[-.5*(((Y1, 1 - M1, 1)^2/(\sigma 1)))]$ $= [1/((2*pi*(\sigma 1)^2)^{\wedge}.5)]*$ $\quad [e^{\wedge}[-.5*(((Y1, 1 - M1, 1)^2/(\sigma 1)))]*$ $\quad [1/((2*pi*(\sigma 1)^2)^{\wedge}.5)]*$ $\quad [e^{\wedge}[-.5*(((Y2, 1 - M1, 2)^2/(\sigma 1)))]*\ldots*$ $\quad [1/((2*pi*(\sigma 1)^2)^{\wedge}.5)]*$ $\quad [e^{\wedge}[-.5*(((Yn, 1 - M1, n)^2/(\sigma 1)))]$ Similarly, calculate (F2,1), (F1,2), (F2,2), (F1, ...), (F2, ...), (F1,r), and (F2,r).

2.1.5 Calculate Posterior Probability

Calculate $P1,1=(S1)*(F1,1)/[\Sigma i(Si*Fi,1)]$. Also calculate (P2,1), (P1,2), (P2,2), (P1, ...), (P2, ...), (P1,t), and (P2,r).

2.1.6 Calculate the Likelihood L $L=\Sigma i, \Sigma r\,(\ln(Fi,r)*Pi,r)$ 2.1.7 Iteration Repeat steps 2.1.3 thru 2.1.6 in an iterative fashion until the posterior probabilities substantially converge.

2.1.7.1 Calculate New $\|M\|$ new $Mi,n=(\Sigma r\,Pi,r*Yn,r)/[\Sigma r(Pi,r)]$ $Mi\rightarrow=(\Sigma r\,Pi,r*Yn,r\rightarrow)/[\Sigma t\,(Pi,r)]$ As an example of this calculation, assume P1,1=0.48, Y1,1=240, and Y1,2=0. Accordingly, M1,1=(0.48*240+...*0+...)/[0.48+...]=44. Perform similar calculation for all 15 rows of M1→. Since I=2, calculate M2→ similarly.

2.1.7.2 Calculate New (σi)^2

$(\sigma 1)^{\wedge}2$ = the square of the variance of segment $i = 1$ $= \sum$ of the square of the variance of $n = 1$ through $n = N$ of segment 1

$= [1/(\sum r\,P1, r)*N]*[\sum r\,[(P1, r)*(Y1, r - M1, 1)^{\wedge}2]] +$ $\quad [1/(\sum r\,P1, r)*N]*$ $\quad [\sum r\,[(P1, r)*(Y2, r - M1, 1)^{\wedge}2]] + \ldots +$ $\quad [1/(\sum r\,P1, r)*N]*[\sum r\,[(P1, r)*(Yn, r - M1, 1)^{\wedge}2]],$ where P is from 2.1.5 and M is from 2.1.7.1.

Since i=2, also calculate (σ2)^2.

2.1.8 Ensure Global Maximum

Repeat steps 2.1.1 through 2.1.7 using a new set of initial conditions.

2.1.9 Repeat for Other Numbers of Segments I

Steps 2.1.1 thru 2.1.8 above were performed for I=2. Repeat steps 2.1.1 thru 2.1.8 for I=1, for I=3, etc.

2.2 CAIC Scoring 2.2.1 Calculate a CAIC Score for I=2 Segments

Identify the final L (likelihood) of each of the two iterations. Identify the final L that is greater of the 2. Also identify the final posterior probabilities that correspond with that greater, final L.

CAIC=(−2)*(ln L)+(N)*(I)*(ln R)

2.2.2 Calculate a CAIC Score for All Other Numbers of Segments I 2.2.3 Identify the Minimum CAIC Score.

The minimum score corresponds to the second optimal number of segments.

3. Determine Subgroups Based on First and Second Optimal Segments

Consider Consumer r. A final posterior probability is defined for consumer r with respect to each segment of the first optimal number of segments. Again, a posterior probability reflects a probability that consumer r belongs to a particular segment. Similarly, a final posterior probability is defined for consumer r with respect to each segment of the second optimal number of segments.

Let $P^\$\rightarrow$=the set of final posterior probabilities corresponding to r, with respect to each segment of the second optimal number of segments. $P^\$\rightarrow=P^\$1,r=I, P^\$2,r=II, \ldots, P^\$I,R=\ldots$.

Let $P^u\rightarrow$=the set of final posterior probabilities corresponding to r, with respect to each segment of the first optimal number of segments. $P^u\rightarrow=P^u1,r=A, P^u2, r B, \ldots, P^uI, R=\ldots$.

Multiply each final posterior probability of the set of $P^\$\rightarrow$ by each final posterior probability of the set of $P^u\rightarrow$. The combination of segments with the largest product of posterior probabilities is selected as a subgroup.

| Segment | Probability |
|---------|-------------|
| I | 0.7 |
| II | 0.3 |
| A | 0.2 |
| B | 0.8 |

| First Optimal # of segments | Second Optimal # of segments | |
|---|---|---|
| | I | II |
| A | 0.14 | 0.06 |
| B | 0.56 | 0.24 |

Accordingly, subgroup BI is identified as the optimal subgroup for consumer r=15. Repeat for all consumers r. If the largest product of posterior probabilities for two different consumers corresponds to a same set of $P^u i,r$ and $P^\$ i,r$, then the two consumers are placed into the same subgroup.

4. Determine Average Currency-Normalized Preference Information for Each Subgroup Calculate the $PW of each subgroup (=Uφ), where φ refers to the number of subgroups (AI, AII, BI, BII, . . . ). For example, assume that the first optimal number of segments is two (segment A and segment B), according to the CAIC score. Also, assume that the second optimal number of segments is two (segment I and segment II). The final posterior probabilities are shown below for consumer r=15.

To obtain a $PW matrix, Uφ→, for each of the subgroups, average the $PW for each consumer of the subgroup for a particular attribute level. Repeat for every attribute level of every attribute (Uφ,n).

5. Mix Preference Information 5.1 Determine Optimal Subgroup for Current Consumer One of the advantages of latent cluster analysis is that a current consumer can be placed into one of the subgroups that were determined in step 3 without performing all the latent class iterations all over again, at least for the cases in which Si for all i are reasonably large. This condition ensures that the addition of the current consumer's preference information to the pool of past consumer preference information doesn't really affect the subgroup definitions.

In other words, in order to place the current consumer in a subgroup, determine, for the current consumer, $P^\$ cr\rightarrow$ for the first optimal number of segments AND determine $P^u cr\rightarrow$ for the second optimal number of segments, where cr=the current consumer.

5.1.1 Determine $P^u cr$ 5.1.1.1 Calculate f→ for the Current Consumer

For the following calculation, use θi→ of the final iteration that began with the initial conditions which yielded the greatest final likelihood L, for the optimal number of segments I.

fi,n,cr=[(θi,n)^Yn,cr]*(1−θi,n)^(1−Yn,cr)

fi,cr→=(fi,1,cr)

. . .

(fi,n,cr).

5.1.1.2 Determine Fi,cr

Determine Fi,cr using the latent class analysis of step 1.

5.1.1.3 Calculate Posterior Probability Pcr→

Determine Pcr→ using the latent class analysis of step 2. In this regard, Pcr→=Pcr^u→. Accordingly, calculation of Pcr→ leads to calculation of Pcr^u→.

5.1.2 Determine $P^\$ cr$ 5.1.2.1 Calculate Fcr→

Fcr→=(F1,cr, F2,cr, . . . , FI,cr)

$$(F1,cr) = \prod n \ [1/((2*pi*(\sigma 1)^\wedge 2)^\wedge .5)]*$$
$$[e^\wedge[-.5*(((Y1, cr - M1, 1)^\wedge 2/(\sigma 1)^\wedge 2))]$$
$$= [1/((2*pi*(\sigma 1)^\wedge 2)^\wedge .5)]*$$
$$[e^\wedge[-.5*(((Y1, cr - M1, 1)^\wedge 2/(\sigma 1)^\wedge 2))]*$$
$$[1/((2*pi*(\sigma 1)^\wedge 2)^\wedge .5)]*$$
$$[e^\wedge[-.5*(((Y2, cr - M1, 2)^\wedge 2/(\sigma 1)^\wedge 2))]*\ldots*$$
$$[1/((2*pi*(\sigma 1)^\wedge 2)^\wedge .5)]*$$
$$[e^\wedge[-.5*(((YN, cr - M1, N)^\wedge 2/(\sigma 1)^\wedge 2))]$$

Since two segments have been deemed optimal, also calculate F2,cr.

5.1.2.2. Calculate Posterior Probability Pi,cr

P1,cr=(S1)*(F1,cr)/[Σi(Si*Fi,cr)]

Also calculate P2,cr because it has been deemed optimal to have two segments. Thus, Pcr$→ is calculated.

5.2 Determine Optimal Mixture of Preference Information Associated with Consumer and Average Preference Information Associated with Optimal Subgroup Because a one-to-one relationship exists between a correlation and a regression, a correlation can be expressed as a regression. This can be calculated with T→=α*1→+β*Pt→, where T→=a column vector with 8 components=(8 trade-off question answers)*($PW conversion factor), 1→=8×1 column vector of 1's, Pt→=8×1 column vector (not to be confused with the posterior probability vector)=(predicted answers based on the preference information)*($PW conversion factor), and α and β are scalar constants. Since the resulting 8 equations include 2 unknowns, α and β, one can solve for α and β.

Similarly, an optimal mixture can be obtained using the equation T→=α*1→+β(w*Pt→+(1−w)Ps→), where Ps→=8×1 column vector=(predicted answers based on the subgroup's average $PW information), w=a scalar that represents the optimal mixture of current consumer and subgroup preference information.

As an example of the foregoing, assume that the actual preference intensity (Pl→) and the predicted preference intensity (Ps→) shown below were calculated during a validation process for the current consumer. Also assume that the $PW conversion factor=$50/util. Moreover, it should be assumed that subgroup BI is the optimal subgroup for the current consumer, and that Ps→ for BI is calculated from the $PW of BI in the same manner as PWdiff→ was calculated from the preference information associated with the current consumer during validation.

T→=Pl→*conversion factor, where Pl→ is shown in table below.
Pt→=PWdiff→*conversion factor, where Pt→ is shown in table below.
I=[1 1 1 1 1 1 1 1]'
T[8,1]={-150, 100, 50, -50, 50, -100, -50, 200};
Pt[8,1]={-61, 146, 61, -22, 10, -46, -90, 139};
Ps[8,1]={-176, 96.5, 45.5, 5.5, 61, -155.5, -61, 121.5};

| Pl→ (utils) | PWdiff→ (utils) | T→ ($) | Pt→ ($) | Ps→ for BI ($) |
|---|---|---|---|---|
| -3.00 | -1.22 | -150 | -61 | -176 |
| 2.00 | 2.92 | 100 | 146 | 96.5 |
| 1.00 | 1.22 | 50 | 61 | 45.5 |
| -1.00 | -0.44 | -50 | -22 | 5.5 |
| 1.00 | 0.2 | 50 | 10 | 61 |
| -2.00 | -0.92 | -100 | -46 | -155.5 |
| -1.00 | -1.8 | -50 | -90 | -61 |
| 4.00 | 2.78 | 200 | 139 | -121.5 |

Using the above assumptions and data, w=0.427. In other words, the optimal mixture is 42.7% current consumer preference information/57.3% B1 subgroup preference information. It should be understood that the foregoing value of w may be determined using the above information and any standard statistical software program such as GAUSS 3.2, copyright 1995, 1996 Aptech Systems, Inc.

Recall that one subgroup was identified in step 3. Alternatively, more than one subgroup may be identified in step 3. For example, identified in step 3 may be three subgroups corresponding to the highest three posterior probability products, subgroups associated with a highest $P^u cr→$ (subgroups BI and BII in the above example), all subgroups corresponding to a posterior probability that is greater than a particular threshold value, or all determined subgroups. In the case that multiple subgroups are identified, Ps→ may be calculated for each subgroup and the foregoing equation may be used to calculate w for each subgroup. A subgroup having the best fit is then used to obtain the optimal mixture.

5.3 Compute Final, Stabilized Currency-Normalized Preference Information Associated with Current Consumer For each attribute level which the current consumer has indicated as acceptable, compute a mixture of current consumer $PW and optimal subgroup $PW using w calculated in step 5.2. Specifically, the final, stabilized $PW matrix for attribute levels that were acceptable to the current consumer=w*$PW matrix associated with current consumer+(1-w)*$PW matrix associated with optimal subgroup. Attribute levels that were unacceptable to the consumer remain unacceptable, regardless of the optimal subgroup.

Detailed Algorithm No. 2
1. Determine First Optimal Segments Based on (Un)Acceptable Attribute Levels
1.1 Definitions and Notation
N=the total number of attribute levels that are either acceptable or unacceptable to a respondent.
n=a specific attribute level, n=1, . . . , N
I=number of acceptable/unacceptable segments
i=a specific segment, i=1, . . . , I
T=total number of respondents for all segments
t=a specific respondent, t=1, . . . , T
j=iteration
$z_t = (z_{1,t}, \ldots, z_{N,t})$; vector with ones (acceptable level) and zero (unacceptable level) for all levels of all attributes 1 to N for respondent t
$\theta^j = (\theta_1^j, \ldots, \theta_I^j)$; matrix with mean of the N attribute levels of the I segments
$\theta_{i,t}^j = (\theta_{i,1}^j, \ldots, \theta_{i,N}^j)'$; vector with the mean of N attribute levels for segment I (' indicates transposition)
$q_{i,t}^j$=Probability that respondent t belongs to segment i
1.2 Latent Cluster Analysis
Do for I=1, . . . , specified number (see section 3.1);
1.2.1 Initial Conditions
$L^0 = 0$
$\theta^1 = (\theta_1^1, \ldots, \theta_N^1)'$; the mean of N attributes
$d_t = \sigma_n(Z_{n,t} - \theta_n^1)$ the difference between respondent t scores and the mean of that attribute level
(t): specific respondent ordered by $d_t$, so each respondent has two indices:
t and
(t)
k=T/I $$q_{i,t}^1 = 1 \text{ if } (t) \in \{k*(i-1)+1, k*(i-1)+2, \ldots, k*i\}$$
$$= 0 \text{ otherwise}$$

Example for 1.2.1:
Suppose there are four respondents (T=4) and two segments (I=2); hence k=2. The table below displays the data. First column gives t, the respondent number. The sum of the differences between score and mean is given in the second column. The third column the respondent number based on the difference. Finally, column four and five give the posterior probabilities. The latter are determined as follows: $q_{1,1}^1 = 0$ because (4) (which is (t))$\notin \{1, \ldots, 2\}$, and $q_{2,1}^1 = 1$ because $(4) \in \{3, \ldots, 4\}$.

| t | $d_t$ | (t) | $q_{1,t}^1$ | $q_{2,t}^1$ |
|---|---|---|---|---|
| 1 | 3 | 4 | 0 | 1 |
| 2 | -2 | 1 | 1 | 0 |
| 3 | -1 | 2 | 1 | 0 |
| 4 | 0 | 3 | 0 | 1 |

1.2.2
Do for j=1, . . . , converged
  Do for i=1, . . . , I;
    Do for n=1, . . . , N;
      $\theta_{i,n}^j = \Sigma_t z_{n,t} q_{i,t}^j / \Sigma_t q_{i,t}^j$; $\theta_{i,n}^j$ should be between 0 and 1.
      $f_{i,t}^j = \Sigma_n q_{i,t}^j (z_{n,t} \ln(\theta_{i,n}^j) + (1-z_{n,t})\ln(1-\theta_{i,n}^j))$; where ln is the natural logarithm
      $Q_i^j = (1/T) \Sigma t \, q_{i,t}^j$
      $L^j = \Sigma_t \Sigma_i f_{i,t}^j$
      $q_{i,t}^{j+1} = Q_i^j \exp(f_{i,t}^j) / \Sigma_i Q_i^j \exp(f_{i,t}^j)$ End 1.2.2 when $|L^j-L^{j-1}|<\in$, where $\in$ is a small number (say 0.0001).

$CAIC_I=-2*L+N*I*\ln(T+1)$; where L is the L for the last iteration j.

$E_I=1-\Sigma_i\Sigma_t(-q_{i,t}*\ln(q_{i,t})/(T*\ln(I))$; $E_I$ is the entropy metric for segments I.

is for the last iteration j.

2. Determine Second Optimal Segments Based on Currency-Normalized Part Worth Values 2.1 Definitions and Notation N=the total number of attribute levels that are either acceptable or unacceptable to a respondent.

n=a specific attribute level, n=1, ..., N

S=number of $-PW segments s=a specific segment, i=1, ..., S

T=total number of respondents for all segments t=a specific respondent, t=1, ..., T j=iteration $y_{n,t}=(y_{1,t}, \ldots, y_{N,t})$, $PW value for attribute level n for respondent t $\mu^j=(\mu_1^j, \ldots, \mu_{s,N}^j)$; matrix with mean of the N attribute levels of the S segments $\mu_s^j=(\mu_{s,1}^j, \ldots, \mu_{s,N}^j)'$; vector with the mean of N attribute levels for segment s $\sigma^{2,j}=(\sigma_1^{2,j}, \ldots, \sigma_I^{2,j})$; vector with variances of each segment (2 means square)

$P_{s,t}^i$=Probability that respondent t belongs to segment s $H^0=0$ 2.2 Latent Cluster Analysis Do for S specified number (see section 3.1);

2.2.1 Initial Conditions $\mu^0=(\mu_1^0, \ldots, \mu_N^0)'$; the mean of N attributes $d_t=\Sigma_n(y_{n,t}-\mu_n^0)*I(y_{n,t}>0)$; the difference between respondent t scores and the mean of that attribute level; I(.) is an indicator function that is equal to one if argument is true and zero otherwise.

(t)=specific respondent ordered by $d_t$; so each respondent has two indices:

t and (t)

k=T/S $$p_{s,t}^1 = 1 \text{ if } (t) \in \{k*(s-1)+1, k*(s-1)+2 \ldots, k*s\}$$
$$= 0 \text{ otherwise}$$

$H^0=0$ 2.2.2

Do for j=1, ..., converged

Do for s=1, ..., S;

Do for n=1, ..., N;

$\mu_{s,n}^j=\Sigma_t(y_{n,t}p_{s,t}^j/\Sigma_t p_{s,t}^j)I(y_{n,t}$ is an acceptable level), where I(.)=1 if argument is true else I(.)=0.

$(\sigma_s^j)^2=\Sigma_n \sigma_t p_{s,t}^j(y_{n,t}-\mu_{s,n}^j)^2 I(y_{n,t}$ is an acceptable level)/$N\Sigma_t p_{s,t}^j$, where I(.)=1 if argument is true else I(.)=0.

$g_{s,t}^j=\Sigma_n p_{s,t}^j(-(y_{n,t}-\mu_{s,n}^j)^2/(2*\sigma_s^j)^2-0.5*\ln(2*pi*(\sigma_s^j)^2))$; where ln is the natural logarithm and pi the number 3.14...

$P_s^j=(1/T)\Sigma_t p_{s,t}^j$ $H^j=\Sigma_t \Sigma_s g_{s,t}^j$ $p_{s,t}^{j+1}=P_s^j \exp(g_{s,t}^j)/\Sigma_s P_s^j \exp(g_{s,t}^j)$ End 2.2.2 when $|H^j-H^{j-1}|<\in$, where $\in$ is a small number (say 0.0001).

$CAIC_S=-2*L+N*I*\ln(T+1)$ $E_S=-\Sigma_s\Sigma_t(-p_{s,t}*\ln(p_{s,t})/(T*\ln(S))$; $E_S$ is the entropy metric for segments S.

3. Creation of Subgroups

There are now I*S possible subgroups. Respondent t is associated with subgroup (i,s) based upon maximum$_{(i,s)}$ of $(q_{i,t}*p_{s,t})$. The $-PW structure of a subgroup is the mean of the $-PW's of the respondents belonging to that subgroup. In calculating the mean, any levels of respondent t that are unacceptable are ignored. The exact algorithm is described below.

Specified number for I (or S)=2, 3 or 4 depending on the number of respondents. The table in section 3.8 gives the value of I (or S); e.g. if there are 200 respondents, then I (or S)$\leqq$=2. From now on we drop "(or S)", but calculations have to be done for both segmentation solutions.

Determine entropy for each segment solution, $E_2, \ldots, E_I$, and the maximum of these $E_m=\max\{E_2, \ldots, E_I\}$. Also, determine $E_2/E_m, \ldots, E_I/E_m$. Refer to section 1.2.4 (and 2.2.4).

Determine the CAIC for 1, ..., I segment solutions. Refer to section 1.2.3 (and 2.2.3).

Select the segment solutions for which $E_j/E_m>0.75$ and $E_i>0.7$ (i=2, ..., I).

Choose the segment solution with the smallest CAIC for which criteria in section 3.4 hold.

When the segmentation solution for (un)acceptable and $-PW are determined, assign based on the multiplication of the posterior probabilities $(q_{i,t}*p_{s,t})$, each respondent to a subgroup.

The subgroups that will be used are those that have at least the minimum number of respondents per subgroup, as defined in the foregoing table.

| Number of respondents | Maximum # of segments | Minimum number of respondents per subgroup |
| --- | --- | --- |
| 100 | 2 | 25 |
| 200 | 2 | 50 |
| 500 | 3 | 75 |
| 1000 | 4 | 75 |
| 1500 | 4 | 100 |

4. Updating of Subgroups

In one embodiment, sections 1 to 3 of this example may be repeated periodically to include new respondents in the subgroups. Below is an example detailing when the repetitions may occur. Section 4.1 applies to a system in its initial stages. Section 4.2 refers to a steady state system.

Initially, create subgroups with first 100, 200, 500, 1000 and 1500 respondents.

From then on, create subgroups of the last 1500 respondents; redo this when 300 new respondents are available. For example, on March 4 the subgroups may be updated to include respondent numbers 25001 to 26500. On March 25, there are 300 new respondents so the subgroups are updated to include respondent numbers 25301 to 26800.

5. Current Respondent

One embodiment for adding a current respondent to a subgroup and then mixing preference information of past respondents with preference information of the current respondent.

5.1 Assign to Segment

Use final $\theta_{i,n}$ and $Q_i$ to determine posterior probability for (un)acceptables for respondent c, with data $z_{n,c}$, for each segment.

$f_{i,c}=\Sigma_n(z_{n,c} \ln(\theta_{i,n})+(1-z_{n,c})\ln(1-\theta_{i,n}))$; where ln is the natural logarithm $q_{i,c}=Q_i\exp(f_{i,c})/\Sigma_i Q_i\exp(f_{i,c})$ Use final $\mu_{s,n}$, $\sigma_s^2$, and $P_s$ to determine posterior probability for $-PW for respondent c, with data $y_{n,c}$, for each segment.

$g_{s,c}=\Sigma_n\{[-(y_{n,c}-\mu_{s,n})^2/(2*\sigma_s^2)-0.5*\ln(2*pi*\sigma_s^2)]*I(t_{n,c}$ is an acceptable level)$\}$; where pi=3.14 . . . , I(.)=1 if argument is true, else I(.)=0.

$p_{s,c}=P_s g_{s,c}/\Sigma_s P_s g_{s,c}$

Determine $i^*=\{i|max(q_{i,c}), i=1, \ldots, I\}$; this defined the (un)acceptable segment this respondent belongs to.

Use all subgroups defined by $i^*$ and s=1, . . . , S, for stabilization.

5.2 Stabilization 5.2.1 Definitions and Notation

T=Trade-off scores of current respondent*Conversion factor to $-PW

Pc=Predicted results for trade-offs from the $-PW structure for the eight trade-offs of current respondent $P_{i^*,s}$=Predicted results for trade-offs of respondents c, from the $-PW structure for the eight trade-offs of the subgroup (i*,s)

α, β, w: Scalar constants.

5.2.2 Algorithm

Based on the following linear regression equation:

Do for s=1, . . . , S $$T = \alpha + \beta(w*Pc + (1-w)P_{i^*,s})$$
$$= \alpha + \beta w*(Pc - P_{i^*,s}) + \beta P_{i^*,s}$$
$$= \alpha + \gamma*(Pc - P_{i^*,s})) + \beta P_{i^*,s}$$

estimates for α, γ, and β are obtained; w is then calculated as w=γ/β

If w>1, w is set to 1; if w<0, w is set to 0.

Determine the $R^2$ of this solution.

Choose the subgroup i*, s* that generates the highest $R^2$.

Stabilized preference structure is then defined by $_PW (stabilized)=w($-PW of current respondent)+(1-w)* ($-PW of subgroup i*, s*)

What is claimed is:

1. A computer-implemented method for calculating adjusted preference information, comprising:

storing, in a computer memory storage system and for a plurality of consumers, preference information related to different attributes of a type of product, the stored preference information for an individual consumer including numerical values that are reflective of the individual consumer's preference for different attribute levels for the attributes of the type of product, and the plurality of consumers including a first consumer, a second consumer, and other consumers;

based on the stored preference information for the plurality of consumers dividing, using a processing device, the plurality of consumers into multiple different sub-groups of constituent members for whom similar preference information is determined to be stored in the computer memory storage system, each of the multiple different sub-groups including less than all of the plurality of consumers;

based on the preference information stored for the first consumer, generating, using a processing device, a first set of trade-off questions for the first consumer that solicit answers from the first consumer regarding choices between different attribute levels for attributes of the type of product;

providing the first set of trade-off questions to the first consumer;

predicting, using a processing device, the first consumer's answers to the first set of trade-off questions;

receiving answers to the first set of trade-off questions from the first consumer;

comparing preference information stored for the first consumer to information that is reflective of the preferences of constituent members of at least some of the multiple sub-groups of consumers;

based on results of comparing the preference information stored for the first consumer to the information that is reflective of the preferences of constituent members of some of the multiple sub-groups of consumers, determining that the preference information stored for the first consumer is similar to preference information stored for constituent members of a first one of the multiple sub-groups of consumers;

selecting, using a processing device, the first sub-group of consumers from among the multiple sub-groups of consumers as a match for the first consumer based on having determined that the preference information stored for the first consumer is similar to preference information stored for constituent members of the first sub-group of consumers;

for at least one attribute level of a particular attribute of the type of product, calculating, using a processing device, an average value of the first sub-group's preference for the at least one attribute level based on the stored values that are reflective of the first sub-group's constituent members' preferences for the at least one attribute level;

based on the first consumer's received answers to the first set of trade-off questions and the predicted answers to the first set of trade-off questions for the first consumer, determining, using a processing device, a first adjustment ratio for use in adjusting the stored value that is reflective of the first consumer's preference for the at least one attribute level, the first adjustment ratio specifying proportions in which the stored value that is reflective of the first consumer's preference for the at least one attribute level and the average value of the first sub-group's preference for the at least one attribute level are to be combined to adjust the stored value that is reflective of the first consumer's preference for the at least one attribute level;

adjusting, using a processing device, the stored value that is reflective of the first consumer's preference for the at least one attribute level as a function of the determined first adjustment ratio and the average value of the first sub-group's preference for the at least one attribute level by combining the stored value that is reflective of the first consumer's preference for the at least one attribute level with the average value of the first sub-group's preference for the at least one attribute level in the proportions for the stored value that is reflective of the first consumer's preference for the at least one attribute level and the average value of the first sub-group's preference for the at least one attribute level specified by the first adjustment ratio;

based on the preference information stored for the second consumer, generating, using a processing device, a second set of trade-off questions for the second consumer that solicit answers from the second consumer regarding choices between different attribute levels for attributes of the type of product;

providing the second set of trade-off questions to the second consumer;

predicting, using a processing device, the second consumer's answers to the second set of trade-off questions;

receiving answers to the second set of trade-off questions from the second consumer;

comparing preference information stored for the second consumer to information that is reflective of the preferences of constituent members of at least some of the multiple sub-groups of consumers;

based on results of comparing the preference information stored for the second consumer to the information that is reflective of the preferences of constituent members of some of the multiple sub-groups of consumers, determining that the preference information stored for the second consumer is similar to preference information stored for constituent members of a second one of the multiple sub-groups of consumers;

selecting, using a processing device, the second sub-group of consumers from among the multiple sub-groups of consumers as a match for the second consumer based on having determined that the preference information stored for the second user is similar to preference information stored for constituent members of the second sub-group of consumers;

for the at least one attribute level, calculating, using a processing device, an average value of the second sub-group's preference for the at least one attribute level based on the stored values that are reflective of the second sub-group's constituent members' preferences for the at least one attribute level;

based on the second consumer's received answers to the second set of trade-off questions and the predicted answers to the second set of trade-off questions for the second consumer, determining, using a processing device, a second adjustment ratio for use in adjusting the stored value that is reflective of the second consumer's preference for the at least one attribute level, wherein the second adjustment ratio is different than the first adjustment ratio and specifies proportions in which the stored value that is reflective of the second consumer's preference for the at least one attribute level and the average value of the second sub-group's preference for the at least one attribute level are to be combined to adjust the stored value that is reflective of the second consumer's preference for the at least one attribute level; and adjusting, using a processing device, the stored value that is reflective of the second consumer's preference for the at least one attribute level as a function of the determined second adjustment ratio and the average value of the second sub-group's preference for the at least one attribute level by combining the stored value that is reflective of the second consumer's preference for the at least one attribute level with the average value of the second sub-group's preference for the at least one attribute level in the proportions for the stored value that is reflective of the second consumer's preference for the at least one attribute level and the average value of the second sub-group's preference for the at least one attribute level specified by the second adjustment ratio.

2. A method according to claim 1, wherein the preference information for the plurality of consumers includes normalized part worth values.

3. A method according to claim 2, wherein the preference for the plurality of consumers includes currency-normalized part worth values.

4. A method according to claim 1, wherein selecting the first sub-group of consumers includes selecting the first sub-group of consumers based on attribute levels identified as unacceptable by constituent members of the first sub-group of consumers.

5. A method according to claim 4, wherein the constituent members of the first sub-group of consumers identified similar attribute levels as unacceptable.

6. A method according to claim 1, wherein selecting the first sub-group of consumers includes selecting the first sub-group of consumers based on part worth values stored for constituent members of the first sub-group of consumers.

7. A method according to claim 6, wherein the constituent members of the first sub-group of consumers are associated with similar preference information.

8. A method according to claim 1, wherein dividing the plurality of consumers into sub-groups includes assigning consumers to sub-groups based on attribute levels that the consumers indicated as unacceptable.

9. A method according to claim 1 wherein dividing the plurality of consumers into sub-groups includes assigning consumers to sub-groups based on part worth values associated with the consumers.

10. A method according to claim 1, further comprising: determining an offer to sell a product based on the mixed preference information.

11. A method according to claim 10, further comprising: providing the offer to the consumer.

12. A method according to claim 1, wherein the first sub-group of consumers is identical to the second sub-group of consumers.

13. A method according to claim 1, wherein the first sub-group of consumers does not include any consumers belonging to the second sub-group of consumers.

14. A method according to claim 1, wherein one or more of the constituent members of the first sub-group of consumers are members of the second sub-group of consumers.

15. A method according to claim 1, wherein the plurality of consumers comprises a predetermined number of past consumers for whom preference information is stored.

16. A method according to claim 15, wherein the predetermined number of past consumers are determined based on a time at which preference information associated with each of the predetermined number of consumers was collected.

17. A method according to claim 1, wherein the plurality of consumers comprises all past consumers for whom preference information was collected during a particular time period.

18. A computer-implemented method for calculating adjusted preference information, comprising:

storing, in a computer memory storage system and for a plurality of consumers, preference information related to different attributes of a type of product, the stored preference information for an individual consumer including numerical values that are reflective of the individual consumer's preference for different attribute levels for the attributes of the type of product, and the plurality of consumers including a particular consumer and other consumers;

based on the stored preference information for the plurality of consumers dividing, using a processing device, the plurality of consumers into multiple different sub-groups of constituent members for whom similar preference information is determined to be stored in the computer memory storage system, each of the multiple different sub-groups including less than all of the plurality of consumers;

based on the preference information stored for the particular consumer, generating, using a processing device, a set of trade-off questions for the particular consumer that solicit answers from the particular consumer regarding choices between different attribute levels for attributes of the type of product;

providing the set of trade-off questions to the particular consumer;

predicting, using a processing device, the particular consumer's answers to the set of trade-off questions;

receiving answers to the set of trade-off questions from the particular consumer;

comparing preference information stored for the particular consumer to information that is reflective of the preferences of constituent members of at least some of the multiple sub-groups of consumers;

based on results of comparing the preference information stored for the particular consumer to information that is reflective of the preferences of constituent members of some of the multiple sub-groups of consumers, determining that the preference information stored for the particular consumer is similar to preference information stored for constituent members of a particular one of the multiple sub-groups of consumers;

selecting, using a processing device, the particular sub-group of consumers from among the multiple sub-groups of consumers as a match for the particular consumer based on having determined that the preference information stored for the particular consumer is similar to preference information stored for constituent members of the particular sub-group of consumers;

for at least one attribute level of a particular attribute of the type of product, calculating, using a processing device, an average value of the particular sub-group's preference for the at least one attribute level based on the stored values that are reflective of the particular sub-group's constituent members' preferences for the at least one attribute level;

based on the particular consumer's received answers to the set of trade-off questions and the predicted answers to the set of trade-off questions for the particular consumer, determining, using a processing device, an adjustment ratio for use in adjusting the stored value that is reflective of the particular consumer's preference for the at least one attribute level, the adjustment ratio specifying proportions in which the stored value that is reflective of the particular consumer's preference for the at least one attribute level and the average value of the particular sub-group's preference for the at least one attribute level are to be combined to adjust the stored value that is reflective of the particular consumer's preference for the at least one attribute level; and adjusting, using a processing device, the stored value that is reflective of the particular consumer's preference for the at least one attribute level as a function of the determined adjustment ratio and the average value of the particular sub-group's preference for the at least one attribute level by combining the stored value that is reflective of the particular consumer's preference for the at least one attribute level with the average value of the particular sub-group's preference for the at least one attribute level in the proportions for the stored value that is reflective of the particular consumer's preference for the at least one attribute level and the average value of the particular sub-group's preference for the at least one attribute level specified by the adjustment ratio.

19. A method according to claim 18, wherein selecting the particular sub-group of consumers includes selecting the particular sub-group of consumers based on attribute levels indicated as unacceptable by constituent members of the particular sub-group of consumers.

20. A method according to claim 19, wherein the constituent members of the particular sub-group of consumers identified similar attribute levels as unacceptable.

21. A method according to claim 18, wherein selecting the particular sub-group of consumers includes selecting the particular sub-group of consumers based on part worth values associated with each of the constituent members of the particular sub-group of consumers.

22. A method according to claim 21, wherein the constituent members of the particular sub-group of consumers are associated with similar part worth values.

23. A computer-implemented method for calculating adjusted consumer preference information, comprising:

receiving, for a plurality of consumers, preference information related to different attributes of a product, the received preference information for an individual consumer including numerical values that are reflective of the individual consumer's preference for different attribute levels for the attributes of the type of product, and the plurality of consumers including a particular consumer and other consumers;

currency-normalizing the received preference information for the plurality of consumers;

storing, in a computer memory storage system, the currency-normalized preference information for the plurality of consumers;

based on the stored, currency-normalized preference information for the plurality of consumers, dividing, using a processing device, the plurality of consumers into multiple different sub-groups of constituent members for whom similar currency-normalized preference information is determined to be stored in the computer memory storage system, each of the multiple different sub-groups including less than all of the plurality of consumers;

based on the currency-normalized preference information stored for the particular consumer, generating, using a processing device, a set of trade-off questions for the particular consumer that solicit answers from the particular consumer regarding choices between different attribute levels for attributes of the type of product;

providing the set of trade-off questions to the particular consumer;

predicting, using a processing device, the particular consumer's answers to the set of trade-off questions;

receiving answers to the set of trade-off questions from the particular consumer;

comparing currency-normalized preference information stored for the particular consumer to information that is reflective of the currency-normalized preferences of constituent members of at least some of the multiple sub-groups of consumers;

based on results of comparing the currency-normalized preference information stored for the particular consumer to information that is reflective of the currency-normalized preferences of constituent members of some of the multiple sub-groups of consumers, determining that the currency-normalized preference information stored for the particular consumer is similar to currency-normalized preference information stored for constituent members of a particular one of the multiple sub-groups of consumers;

selecting, using a processing device, the particular sub-group of consumers from among the multiple sub-groups of consumers as a match for the particular consumer based on having determined that the currency-normalized preference information stored for the particular consumer is similar to currency-normalized preference information stored for constituent members of the particular sub-group of consumers;

for at least one attribute level of a particular attribute of the type of product, calculating, using a processing device, an average value of the particular sub-group's currency-normalized preference for the at least one attribute level based on the stored currency-normalized values that are reflective of the particular sub-group's constituent members' currency-normalized preferences for the at least one attribute level;

based on the particular consumer's received answers to the set of trade-off questions and the predicted answers to the set of trade-off questions for the particular consumer, determining, using a processing device, an adjustment ratio for use in adjusting the currency-normalized stored value that is reflective of the particular consumer's currency-normalized preference for the at least one attribute level, the adjustment ratio specifying proportions in which the currency-normalized stored value that is reflective of the particular consumer's currency-normalized preference for the at least one attribute level and the average value of the particular sub-group's currency-normalized preference for the at least one attribute level are to be combined to adjust the currency-normalized stored value that is reflective of the particular consumer's preference for the at least one attribute level; and adjusting, using a processing device, the stored currency-normalized value that is reflective of the particular consumer's currency-normalized preference for the at least one attribute level as a function of the determined adjustment ratio and the average value of the particular sub-group's currency-normalized preference for the at least one attribute level by combining the currency-normalized stored value that is reflective of the particular consumer's currency-normalized preference for the at least one attribute level with the average value of the particular sub-group's currency-normalized preference for the at least one attribute level in the proportions for the currency-normalized stored value that is reflective of the particular consumer's currency-normalized preference for the at least one attribute level and the average value of the particular sub-group's currency-normalized preference for the at least one attribute level specified by the adjustment ratio.

24. A method according to claim 23, further comprising: providing an offer based on the currency-normalized information.

25. A method according to claim 24, further comprising: providing the offer to the consumer.

26. A computer-readable medium storing instructions that, when executed by a processor, cause the processor to:

store, for a plurality of consumers, preference information related to different attributes of a type of product, the stored preference information for an individual consumer including numerical values that are reflective of the individual consumer's preference for different attribute levels for the attributes of the type of product, and the plurality of consumers including a first consumer, a second consumer, and other consumers;

based on the stored preference information for the plurality of consumers, divide the plurality of consumers into multiple different sub-groups of constituent members for whom similar preference information is determined to be stored, each of the multiple different sub-groups including less than all of the plurality of consumers;

generate, based on the preference information stored for the first consumer, a first set of trade-off questions for the first consumer that solicit answers from the first consumer regarding choices between different attribute levels for attributes of the type of product;

provide the first set of trade-off questions to the first consumer;

predict the first consumer's answers to the first set of trade-off questions;

receive answers to the first set of trade-off questions from the first consumer;

compare preference information stored for the first consumer to information that is reflective of the preferences of constituent members of at least some of the multiple sub-groups of consumers;

based on results of comparing the preference information stored for the first consumer to the information that is reflective of the preferences of constituent members of some of the multiple sub-groups of consumers, determine that the preference information stored for the first consumer is similar to preference information stored for constituent members of a first one of the multiple sub-groups of consumers;

select, from among the multiple sub-groups of consumers, the first sub-group of consumers as a match for the first consumer based on having determined that the preference information for the first consumer is similar to preference information stored for constituent members of the first sub-group of consumers;

calculate, for at least one attribute level of a particular attribute of the type of product, an average value of the first sub-group's preference for the at least one attribute level based on the stored values that are reflective of the first sub-group's constituent members' preferences for the at least one attribute level;

determine, based on the first consumer's received answers to the first set of trade-off questions and the predicted answers to the first set of trade-off questions for the first consumer, a first adjustment ratio for use in adjusting the stored value that is reflective of the first consumer's preference for the at least one attribute level, the first adjustment ratio specifying proportions in which the stored value that is reflective of the first consumer's preference for the at least one attribute level and the average value of the first sub-group preference for the at least one attribute level are to be combined to adjust the stored value that is reflective of the first consumer's preference for the at least one attribute level;

adjust the stored value that is reflective of the first consumer's preference for the at least one attribute level as a function of the determined first adjustment ratio and the average value of the first sub-group's preference for the at least one attribute level by combining the stored value that is reflective of the first consumer's preference for the at least one attribute level with the average value of the first sub-group's preference for the at least one attribute level in the proportions for the stored value that is reflective of the first consumer's preference for the at least one attribute level and the average value of the first sub-group's preference for the at least one attribute level specified by the first adjustment ratio;

based on the preference information stored for the second consumer, generate a second set of trade-off questions for the second consumer that solicit answers from the second consumer regarding choices between different attribute levels for attributes of the type of product;

provide the second set of trade-off questions to the second consumer;

predict the second consumer's answers to the second set of trade-off questions;

receive answers to the second set of trade-off questions from the second consumer;

compare preference information stored for the second consumer to information that is reflective of the preferences of constituent members of at least some of the multiple sub-groups of consumers, based on results of comparing the preference information stored for the second consumer to information that is reflective of the preferences of constituent members of some of the multiple sub-groups of consumers, determine that the preference information stored for the second consumer is similar to preference information stored for constituent members of a second one of the multiple sub-groups of consumers;

select, from among the multiple sub-groups of consumers, the second sub-group of consumers as a match for the second consumer based on having determined that the preference information stored for the second consumer is similar to the preference information stored for constituent members of the second sub-group of consumers;

calculate, for the at least one attribute level, an average value of the second sub-group's preference for the at least one attribute level based on the stored values that are reflective of the second sub-group's constituent members' preferences for the at least one attribute level;

determine, based on the second consumer's received answers to the second set of trade-off questions and the predicted answers to the second set of trade-off questions for the second consumer, a second adjustment ratio for use in adjusting the stored value that is reflective of the second consumer's preference for the at least one attribute level, wherein the second adjustment ratio is different than the first adjustment ratio and specifies proportions in which the stored value that is reflective of the second consumer's preference for the at least one attribute level and the average value of the second sub-group's preference for the at least one attribute level are to be combined to adjust the stored value that is reflective of the second consumer's preference for the at least one attribute level; and adjust the stored value that is reflective of the second consumer's preference for the at least one attribute level as a function of the determined second adjustment factor and the average value of the second sub-group's preference for the at least one attribute level by combining the stored value that is reflective of the second consumer's preference for the at least one attribute level with the average value of the second sub-group's preference for the at least one attribute level in the proportions for the stored value that is reflective of the second consumer's preference for the at least one attribute level and the average value of the second sub-group's preference for the at least one attribute level specified by the second adjustment ratio.

27. A computer-readable medium according to claim 26, wherein the preference information for the plurality of consumers comprise normalized part worth values.

28. A computer-readable medium according to claim 27, wherein the preference information for the plurality of consumers comprise currency-normalized part worth values.

29. A computer-readable medium according to claim 26, wherein the instructions that, when executed by a processor, cause the processor to select the first sub-group of consumers include instructions that, when executed by a processor, cause the processor to select the first sub-group of consumers based on attribute levels identified as unacceptable by each of the constituent members of the first sub-group of consumers.

30. A computer-readable medium according to claim 29, wherein the constituent members of the first sub-group of consumers identified similar attribute levels as unacceptable.

31. A computer-readable medium according to claim 26, wherein the instructions that, when executed by a processor, cause the processor to select the first sub-group of consumers include instructions that, when executed by a processor, cause the processor to select the first sub-group of consumers based on part worth values associated with each of the constituent members of the first sub-group of consumers.

32. A computer-readable medium according to claim 31, wherein the constituent members of the first sub-group of consumers are associated with similar preference information.

33. A computer-readable medium according to claim 26, wherein the instructions that, when executed by a processor, cause the processor to divide the plurality of consumers into multiple different sub-groups include instructions that, when executed by a processor, cause the processor to assign consumers to sub-groups based on attribute levels that the consumers indicated as unacceptable.

34. A computer-readable medium according to claim 26, wherein the instructions that, when executed by a processor, cause the processor to divide the plurality of consumers into multiple different sub-groups include instructions that, when executed by a processor, cause the processor to assign consumers to sub-groups based on part worth values associated with the consumers.

35. A computer-readable medium according to claim 26, the computer-readable medium further storing instructions that, when executed by a processor, cause the processor to:
determine an offer to sell a product based on the mixed preference information.

36. A computer-readable medium according to claim 35, the computer-readable medium further storing instructions that when executed by a processor, cause the processor to:
provide the offer to the consumer.

37. A computer-readable medium according to claim 26, wherein the first sub-group of consumers is identical to the second sub-group of consumers.

38. A computer-readable medium according to claim 26, wherein the first sub-group of consumers does not include any consumers belonging to the second sub-group of consumers.

39. A computer-readable medium according to claim 26, wherein one or more of the constituent members of the first sub-group of consumers belong to the second sub-group of consumers.

40. A computer-readable medium according to claim 26, wherein the plurality of consumers comprises a predetermined number of past consumers for whom preference information is stored.

41. A computer-readable medium according to claim 40, wherein the predetermined number of past consumers are determined based on a time at which preference information associated with each of the predetermined number of consumers was collected.

42. A computer-readable medium according to claim 26, wherein the plurality of consumers comprises all past consumers for whom preference information was collected during a particular time period.

43. A computer-readable medium storing instructions that, when executed by a processor, cause the processor to:
- store, for a plurality of consumers, preference information related to different attributes of a type of product, the stored preference information for an individual consumer including numerical values that are reflective of the individual consumer's preference for different attribute levels for the attributes of the type of product, and the plurality of consumers including a particular consumer and other consumers;
- based on the stored preference information for the plurality of consumers, divide the plurality of consumers into multiple different sub-groups of constituent members for whom similar preference information is determined to be stored, each of the multiple different sub-groups including less than all of the plurality of consumers;
- based on the preference information stored for the particular consumer, generate a set of trade-off questions for the particular consumer that solicit answers from the particular consumer regarding choices between different attribute levels for attributes of the type of product;
- provide the set of trade-off questions to the particular consumer;
- predict the particular consumer's answers to the set of trade-off questions;
- receive answers to the set of trade-off questions from the particular consumer;
- compare preference information stored for the particular consumer to information that is reflective of the preferences of constituent members of at least some of the multiple sub-groups of consumers;
- based on results of comparing the preference information stored for the particular consumer to the information that is reflective of the preferences of constituent members of some of the multiple sub-groups of consumers, determine that the preference information stored for the particular consumer is similar to preference information stored for constituent members of a particular one of the multiple sub-groups of consumers;
- select, from among the multiple sub-groups of consumers, the particular sub-group of consumers as a match for the particular consumer based on having determined that the preference information stored for the particular consumer is similar to preference information stored for constituent members of the particular sub-group of consumers;
- calculate, for at least one attribute level of a particular attribute of the type of product, an average value of the particular sub-group's preference for the at least one attribute level based on the stored values that are reflective of the particular sub-group's constituent members' preferences for the at least one attribute level;
- based on the particular consumer's received answers to the set of trade-off questions and the predicted answers to the set of trade-off questions for the particular consumer, determine an adjustment ratio for use in adjusting the stored value that is reflective of the particular consumer's preference for the at least one attribute level, the adjustment ratio specifying proportions in which the stored value that is reflective of the particular consumer's preference for the at least one attribute level and the average value of the particular sub-group's preference for the at least one attribute level are to be combined to adjust the stored value that is reflective of the particular consumer's preference for the at least one attribute level; and
- adjust the stored value that is reflective of the particular consumer's preference for the at least one attribute level as a function of the determined adjustment ratio and the average value of the particular sub-group's preference for the at least one attribute level by combining the stored value that is reflective of the particular consumer's preference for the at least one attribute level with the average value of the particular sub-group's preference for the at least one attribute level in the proportions for the stored value that is reflective of the particular consumer's preference for the at least one attribute level and the average value of the particular sub-group's preference for the at least one attribute level specified by the adjustment ratio.

44. A computer-readable medium according to claim 43, wherein the instructions that, when executed by a processor, cause the processor to select the particular sub-group of consumers include instructions that, when executed by a processor, cause a processor to select the particular sub-group of consumers based on attribute levels indicated as unacceptable by each constituent member of the particular sub-group of consumers.

45. A computer-readable medium according to claim 44, wherein the constituent members of the particular sub-group of consumers identified similar attribute levels as unacceptable.

46. A computer-readable medium according to claim 43, wherein the instructions that, when executed by a processor, cause the processor to select the particular sub-group of consumers include instructions that, when executed by a processor, cause the processor to select the particular sub-group of consumers based on part worth values associated with each of the constituent members of the particular sub-group of consumers.

47. A computer-readable medium according to claim 46, wherein the constituent members of the particular sub-group of consumers are associated with similar part worth values.

48. A computer-readable medium storing instructions that, when executed by a processor, cause the processor to:
- receive, for a plurality of consumers, preference information related to different attributes of a product, the received preference information for an individual consumer including numerical values that are reflective of the individual consumer's preference for different attribute levels for the attributes of the type of product, and the plurality of consumers including a particular consumer and other consumers;
- currency-normalize the received preference information for the plurality of consumers;
- store the currency-normalized preference information for the plurality of consumers;
- based on the stored, currency-normalized preference information for the plurality of consumers, divide the plurality of consumers into multiple different sub-groups of constituent members for whom similar currency-normalized preference information is determined to be stored, each of the multiple different sub-groups including less than all of the plurality of consumers;
- generate, based on the currency-normalized preference information stored for the particular consumer, a set of trade-off questions for the particular consumer that solicit answers from the particular consumer regarding choices between different attribute levels for attributes of the type of product;

provide the set of trade-off questions to the particular consumer;

predict the particular consumer's answers to the set of trade-off questions;

receive answers to the set of trade-off questions from the particular consumer;

compare currency-normalized preference information stored for the particular consumer to information that is reflective of the currency-normalized preferences of constituent members of at least some of the multiple sub-groups of consumers;

based on results of comparing the currency-normalized preference information stored for the particular consumer to the information that is reflective of the currency-normalized preferences of constituent members of some of the multiple sub-groups of consumers, determine that the currency-normalized preference information stored for the particular consumer is similar to currency-normalized preference information stored for constituent members of a particular one of the multiple sub-groups of consumers;

select, from among the multiple sub-groups of consumers, the particular sub-group of consumers as a match for the particular consumer based on having determined that the currency-normalized preference information stored for the particular consumer is similar to currency-normalized preference information stored for constituent members of the particular sub-group of consumers;

calculate, for at least one attribute level of a particular attribute of the type of product, an average value of the particular sub-group's currency-normalized preference for the at least one attribute level based on the stored currency-normalized values that are reflective of the particular sub-group's constituent members' currency-normalized preferences for the at least one attribute level;

determine, based on the particular consumer's received answers to the set of trade-off questions and the predicted answers to the set of trade-off questions for the particular consumer, an adjustment ratio for use in adjusting the currency-normalized stored value that is reflective of the particular consumer's currency-normalized preference for the at least one attribute level, the adjustment ratio specifying proportions in which the currency-normalized stored value that is reflective of the particular consumer's currency-normalized preference for the at least one attribute level and the average value of the particular sub-group's currency-normalized preference for the at least one attribute level are to be combined to adjust the currency-normalized stored value that is reflective of the particular consumer's currency-normalized preference for the at least one attribute level; and adjust the stored currency-normalized value that is reflective of the particular consumer's currency-normalized preference for the at least one attribute level as a function of the determined adjustment ratio and the currency-normalized value of the particular sub-group's currency-normalized preference for the at least one attribute level by combining the currency-normalized stored value that is reflective of the particular consumer's currency-normalized preference for the at least one attribute level with the average value of the particular sub-group's currency-normalized preference for the at least one attribute level in the proportions for the currency-normalized stored value that is reflective of the particular consumer's currency-normalized preference for the at least one attribute level and the average value of the particular sub-group's currency-normalized preference for the at least one attribute level specified by the adjustment ratio.

49. A computer-readable medium according to claim 48, the computer-readable medium further storing instructions that, when executed by a processor, cause the processor to:
provide an offer based on the currency-normalized information.

50. A computer-readable medium according to claim 49, the computer-readable medium further storing instructions that, when executed by a processor, cause the processor to:
provide the offer to the consumer.

* * * * *